United States Patent
Jiang et al.

(10) Patent No.: US 12,034,510 B2
(45) Date of Patent: Jul. 9, 2024

(54) INDICATION METHOD, INFORMATION DETERMINATION METHOD, APPARATUS, BASE STATION, TERMINAL AND STORAGE MEDIUM

(71) Applicant: ZTE CORPORATION, Guangdong (CN)

(72) Inventors: Chuangxin Jiang, Guangdong (CN); Zhaohua Lu, Guangdong (CN); Yu Ngok Li, Guangdong (CN); Yijian Chen, Guangdong (CN); Hao Wu, Guangdong (CN); Bo Gao, Guangdong (CN); Yuxin Wang, Guangdong (CN); Shujuan Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 555 days.

(21) Appl. No.: 17/280,391

(22) PCT Filed: Sep. 27, 2019

(86) PCT No.: PCT/CN2019/108575
§ 371 (c)(1),
(2) Date: Mar. 26, 2021

(87) PCT Pub. No.: WO2020/063877
PCT Pub. Date: Apr. 2, 2020

(65) Prior Publication Data
US 2021/0367655 A1  Nov. 25, 2021

(30) Foreign Application Priority Data
Sep. 27, 2018 (CN) .......................... 201811133472.9

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0456* (2013.01); *H04L 5/0051* (2013.01);
(Continued)

(58) Field of Classification Search
CPC .. H04B 7/0639; H04B 7/0456; H04B 7/0478; H04B 7/0691; H04B 7/0404;
(Continued)

(56) References Cited

U.S. PATENT DOCUMENTS

2019/0103907 A1* 4/2019 Yang ................. H04L 25/03898
2019/0158171 A1* 5/2019 Ren ..................... H04B 7/0663
(Continued)

FOREIGN PATENT DOCUMENTS

| CN | 108111272 A | 6/2018 |
|----|-------------|--------|
| CN | 108111283 A | 6/2018 |

(Continued)

OTHER PUBLICATIONS

"Codebook based transmission with multiple SRI"; Ericsson; 3GPP TSG-RAN WG1 #91 R1-1720716 Reno, USA, Nov. 27-Dec. 1, 2017 (Year: 2017).*
(Continued)

*Primary Examiner* — Benjamin H Elliott, IV
(74) *Attorney, Agent, or Firm* — KDW Firm PLLC

(57) ABSTRACT

Provided are an indication method, an information determination method, an apparatus, a base station, a terminal and a storage medium. The method includes notifying a demodulation reference signal (DMRS) port indicator, a sounding reference signal resource indicator (SRI) and a transmission precoding matrix indicator to a terminal to notify basic information. The basic information includes at least one of DMRS port indication information, precoding codebook or
(Continued)

precoding matrix information, or a codebook subset restriction (CSR). The basic information is determined based on a value of the SRI.

16 Claims, 5 Drawing Sheets

(51) Int. Cl.
　　*H04L 5/00*　　　(2006.01)
　　*H04L 25/02*　　　(2006.01)
　　*H04W 16/28*　　　(2009.01)
　　*H04W 72/044*　　(2023.01)
　　*H04W 72/23*　　　(2023.01)

(52) U.S. Cl.
　　CPC ......... *H04L 25/0226* (2013.01); *H04W 16/28* (2013.01); *H04W 72/046* (2013.01); *H04W 72/23* (2023.01)

(58) Field of Classification Search
　　CPC . H04B 7/0689; H04L 5/0051; H04L 25/0226; H04L 5/0023; H04L 5/0048; H04L 5/0053; H04L 5/0091; H04L 5/0094; H04W 16/28; H04W 72/046; H04W 72/23
　　See application file for complete search history.

(56) References Cited

U.S. PATENT DOCUMENTS

| | | | | |
|---|---|---|---|---|
| 2020/0083939 | A1* | 3/2020 | Park | H04L 5/0051 |
| 2020/0106591 | A1* | 4/2020 | Chen | H04B 7/0456 |
| 2021/0367655 | A1* | 11/2021 | Jiang | H04B 7/0639 |

FOREIGN PATENT DOCUMENTS

| | | |
|---|---|---|
| CN | 108112075 A | 6/2018 |
| EP | 3667978 A1 | 6/2020 |
| WO | 2018056789 A1 | 3/2018 |
| WO | 2018117738 A1 | 6/2018 |

OTHER PUBLICATIONS

"Summary on Codebook Based UL Transmission"; Intel; 3GPP TSG RAN WG1 Meeting AH 1801 R1-1801041 Vancouver, Canada, Jan. 22-26, 2018 (Year: 2018).*
"Codebook Subset Restriction in advanced CSI"; Huawei et al.; 3GPP TSG RAN WG1 Meeting #92 R1-1801870 Athens, Greece, Feb. 26-Mar. 2, 2018 (Year: 2018).*
"Codebook subset restriction for advanced CSI codebook"; Samsung; 3GPP TSG RAN WG1 Meeting #92 R1-1801909 Athens, Greece, Feb. 26-Mar. 2, 2018 (Year: 2018).*
"Discussion on CBSR for advanced CSI"; LG Electronics; 3GPP TSG RAN WG1 Meeting #92 R1-1802241 Athens, Greece, Feb. 26-Mar. 2, 2018 (Year: 2018).*
"On Advanced CSI codebook subset restriction"; Ericsson; 3GPP TSG RAN WG1 Meeting #92 R1-1802733 Athens, Greece, Feb. 26-Mar. 2, 2018 (Year: 2018).*
First Office Action for Canada Patent Application No. 3114463, dated Mar. 24, 2022 four (4) pages.
First Official Action for Chinese Patent Application No. 201811334729, dated May 25, 2022 (14 pages).
First Search Report for Chinese Patent Application No. 201811334729, dated May 19, 2022 (four (4) pages).
Extended European Search Report for Application No. 19864662.2, dated May 25, 2022 (eight (8) pages.
ZTE, Sanechips. Codebook based UL transmission. 3GPP TSG RAN WG1 Meeting 90bis. Prague, CZ, Oct. 9-13, 2017. R1-1717417.
Ericsson. Codebook based transmission with multiple SRI. 3GPP TSG-RAN WG1 #91. Reno, USA, Nov. 27-Dec. 1, 2017. R1-1720716.
ZTE. "Codebook based UL transmission" 3GPP TSG RAN WG1 Meeting #89 R1-1707113, May 19, 2017.
International Search Report for the International Patent Application No. PCT/CN2019/108575, mailed Dec. 27, 2019, 2 pages.

* cited by examiner

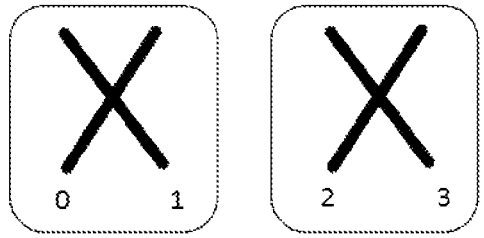
FIG. 3
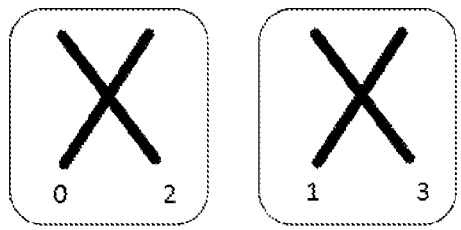
FIG. 4
$$\begin{bmatrix} a & 0 \\ b & 0 \\ 0 & c \\ 0 & d \end{bmatrix} \Rightarrow \begin{bmatrix} c & 0 \\ d & 0 \\ 0 & a \\ 0 & b \end{bmatrix}$$
FIG. 5
$$\begin{bmatrix} a & c & 0 \\ b & d & 0 \\ 0 & 0 & e \\ 0 & 0 & f \end{bmatrix} \Rightarrow \begin{bmatrix} e & 0 & 0 \\ f & 0 & 0 \\ 0 & a & c \\ 0 & b & d \end{bmatrix}$$
FIG. 6

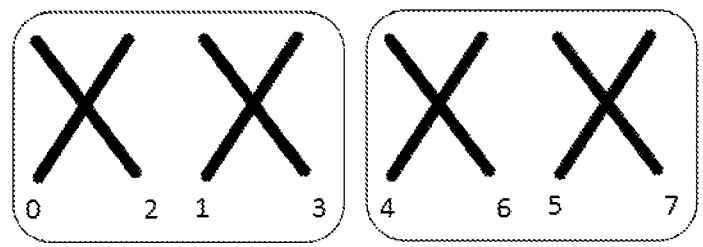
FIG. 7
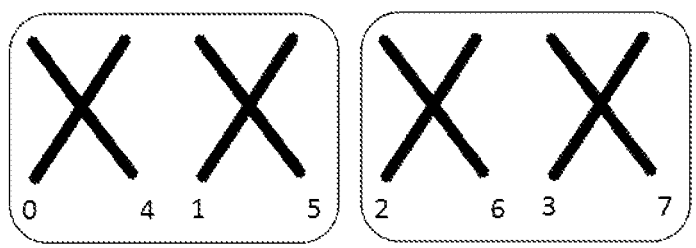
FIG. 8A
FIG. 8B

FIG. 9
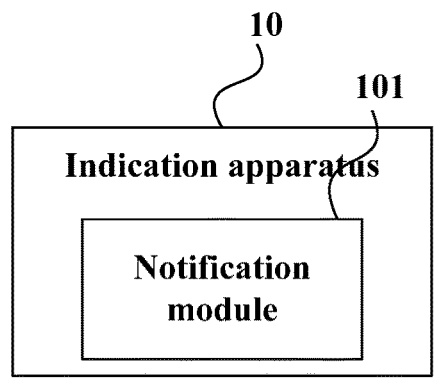
FIG. 10
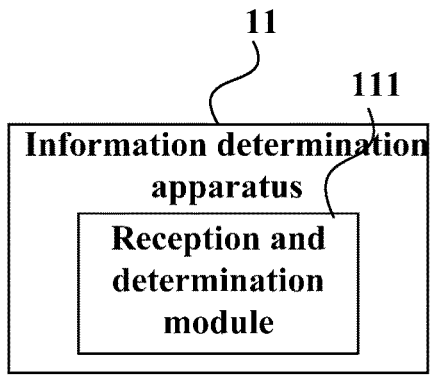
FIG. 11

INDICATION METHOD, INFORMATION DETERMINATION METHOD, APPARATUS, BASE STATION, TERMINAL AND STORAGE MEDIUM

CROSS-REFERENCES TO RELATED APPLICATIONS

This application is a national stage application filed under 35 U.S.C. 371 based on International Patent Application No. PCT/CN2019/108575, filed on Sep. 27, 2019, which claims priority to Chinese Patent Application No. 201811133472.9 filed with the CNIPA on Sep. 27, 2018, the disclosures of which are incorporated herein by reference in their entireties.

TECHNICAL FIELD

The present disclosure relates to, but is not limited to, the field of communications and, in particular, relates to, but is not limited to, an indication method, an information determination method, an apparatus, a base station, a terminal and a storage medium.

BACKGROUND

The codebook-based UL transmission scheme of New Radio (NR) supports two antenna ports and four antenna ports. For two antenna ports, as shown in FIG. 1A, a base station configures downlink control information (DCI) to carry an indicator about precoding information and the number of layers for two antenna ports. The indicator about precoding information and the number of layers is used for indicating a transmission precoding matrix indicator (TPMI) and the number of transmission layers. Since two antenna ports may be used for coherent transmission, the two antenna ports may be considered to be from the same panel. For four antenna ports, as shown in FIG. 1B, the base station configures the DCI to carry an indicator about precoding information and the number of layers for four antenna ports. Since four antenna ports may be used for coherent transmission, the four antenna ports may be considered to be from the same panel. The precoding codebook for two antenna ports and the precoding codebook for four antenna ports are set forth in protocol 38.211.

The codebook-based uplink transmission can also be applied at high frequencies. However, the codebook-based uplink transmission can be applied to only single-analog-beam transmission or single-antenna-panel transmission. However, no solution is provided to the problem of how to support multi-panel transmission or how to flexibly support dynamic indication between single-panel transmission and multi-panel transmission.

SUMMARY

Embodiments of the present disclosure provide an indication method, an information determination method, an apparatus, a base station, a terminal and a storage medium and provide a scheme for supporting multi-panel transmission or flexibly supporting dynamic indication between single-panel transmission and multi-panel transmission.

An embodiment of the present disclosure provides an indication method. The method includes notifying a demodulation reference signal (DMRS) port indicator, a sounding reference signal resource indicator (SRI) and a transmission precoding matrix indicator to a terminal to notify basic information. The basic information includes at least one of DMRS port indication information, precoding codebook or precoding matrix information, or a codebook subset restriction (CSR).

The basic information is determined based on a value of the SRI.

An embodiment of the present disclosure provides an information determination method. The method includes Receiving a DMRS port indicator, an SRI and a transmission precoding matrix indicator notified by a base station to determine basic information. The basic information includes at least one of DMRS port indication information, precoding codebook or precoding matrix information, or a CSR.

The basic information is determined based on a value of the SRI.

An embodiment of the present disclosure provides an indication apparatus. The apparatus includes a notification module.

The notification module is configured to notify a DMRS port indicator, an SRI and a transmission precoding matrix indicator to a terminal to notify basic information. The basic information includes at least one of DMRS port indication information, precoding codebook or precoding matrix information, or a CSR.

The basic information is determined based on a value of the SRI.

An embodiment of the present disclosure provides an information determination apparatus. The apparatus includes a reception and determination module.

The reception and determination module is configured to receive a DMRS port indicator, an SRI and a transmission precoding matrix indicator notified by a base station to determine basic information. The basic information includes at least one of DMRS port indication information, precoding codebook or precoding matrix information, or a CSR.

The basic information is determined based on a value of the SRI.

An embodiment of the present disclosure provides a base station. The base station includes a first processor, a first memory and a first communication bus.

The first communication bus is configured to enable connection and communication between the first processor and the first memory.

The first processor is configured to execute at least one first program stored in the first memory to perform the preceding indication method.

An embodiment of the present disclosure provides a terminal. The terminal includes a second processor, a second memory and a second communication bus.

The second communication bus is configured to enable connection and communication between the second processor and the second memory.

The second processor is configured to execute at least one second program stored in the second memory to perform the preceding information determination method.

An embodiment of the present disclosure provides a storage medium. The computer-readable storage medium stores at least one computer program executable by at least one processor for implementation of the preceding indication method or the preceding information determination method.

In the indication method, information determination method, apparatus, base station, terminal and storage medium provided in embodiments of the present disclosure, the DMRS port indicator, the SRI and the transmission precoding matrix indicator are notified to the terminal so that terminal can determine the basic information (the basic information includes at least one of the DMRS port indication information, the precoding codebook or precoding matrix information, or the CSR, and the basic information is determined based on the value of the SRI) required for codebook-based uplink transmission. In this manner, the terminal can implement data transmission in a single-panel or multiple-panel case according to the requirements of the base station. That is, the base station can notify the DMRS mapping information, the CSR, the precoding codebook and the like implicitly according to the dynamic indication of the SRI, thereby enabling the terminal to dynamically switch between a single beam and multiple beams effectively. In this manner, multi-panel transmission can be supported, and dynamic indication between single-panel transmission and multi-panel transmission can be flexibly supported.

BRIEF DESCRIPTION OF DRAWINGS

FIG. 3 is a structure diagram of two antenna panels having four antenna ports according to an embodiment of the present disclosure.

FIG. 4 is a structure diagram of another type of two antenna panels having four antenna ports according to an embodiment of the present disclosure.

FIG. 5 is a schematic diagram illustrating diagonal commutation according to an embodiment of the present disclosure.

FIG. 6 is a schematic diagram illustrating another diagonal commutation according to an embodiment of the present disclosure.

FIG. 7 is a schematic diagram illustrating another diagonal commutation according to an embodiment of the present disclosure.

FIG. 8A is a structure diagram of two antenna panels having eight antenna ports according to an embodiment of the present disclosure.

FIG. 8B is a structure diagram of another type of two antenna panels having eight antenna ports according to an embodiment of the present disclosure.

FIG. 9 is a schematic diagram illustrating diagonal commutation according to an embodiment of the present disclosure.

FIG. 10 is a structure diagram of an indication apparatus according to embodiment eleven of the present disclosure.

FIG. 11 is a structure diagram of an information determination apparatus according to embodiment eleven of the present disclosure.

DETAILED DESCRIPTION

Figure 1A:
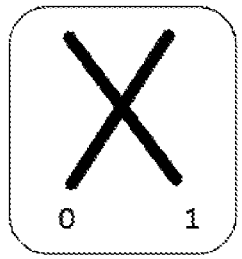
FIG. 1A is a schematic diagram illustrating two antenna ports according to the related art.
Figure 1B:
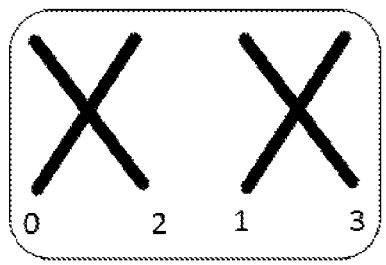
FIG. 1B is a schematic diagram illustrating four antenna ports according to the related art.

Embodiments of the present disclosure are described in more detail hereinafter with reference to the drawings. However, the concept of the present disclosure may be embodied in many different forms and is not to be construed as being limited to the embodiments illustrated herein. Rather, these embodiments are provided to make the present disclosure thorough and complete and fully convey the scope of the concept of the present disclosure to those skilled in the art. Throughout the preceding description and the drawings, the same reference numerals and signs refer to the same or similar elements.

It is to be understood that although terms such as first and second may be used herein to describe elements or operations, these elements or operations are not to be limited by these terms. These terms are only used to distinguish one element or operation from another. For example, without departing from the teachings of the present disclosure, a first feature may be referred to as a second feature, and similarly, the second feature may be referred to as the first feature.

The terms used herein are intended to describe particular embodiments and not to limit the concept of the present disclosure. As used herein, unless otherwise clearly indicated in the context, a singular form "a", "one" or "the" is intended to include a plural form. It is to be further understood that the term "including" or "comprising" used in the specification specifies the existence of the described features, regions, parts, steps, operations, elements and/or components, without excluding the existence or addition of one or more other features, regions, parts, steps, operations, elements, components and/or combinations thereof.

Unless otherwise defined, all the terms (including technical and scientific terms) used herein have the same meanings as those commonly understood by those skilled in the art to which the present disclosure pertains. It is to be further understood that terms, such as those defined in commonly used dictionaries, are to be interpreted as having meanings consistent with their meanings in the context of the related art and/or the present disclosure and are not to be interpreted in an idealized or overly formal sense unless expressly so defined herein.

Embodiments of the present disclosure are described in more detail hereinafter in conjunction with the drawings and implementations.

Embodiment One

Figure 2:
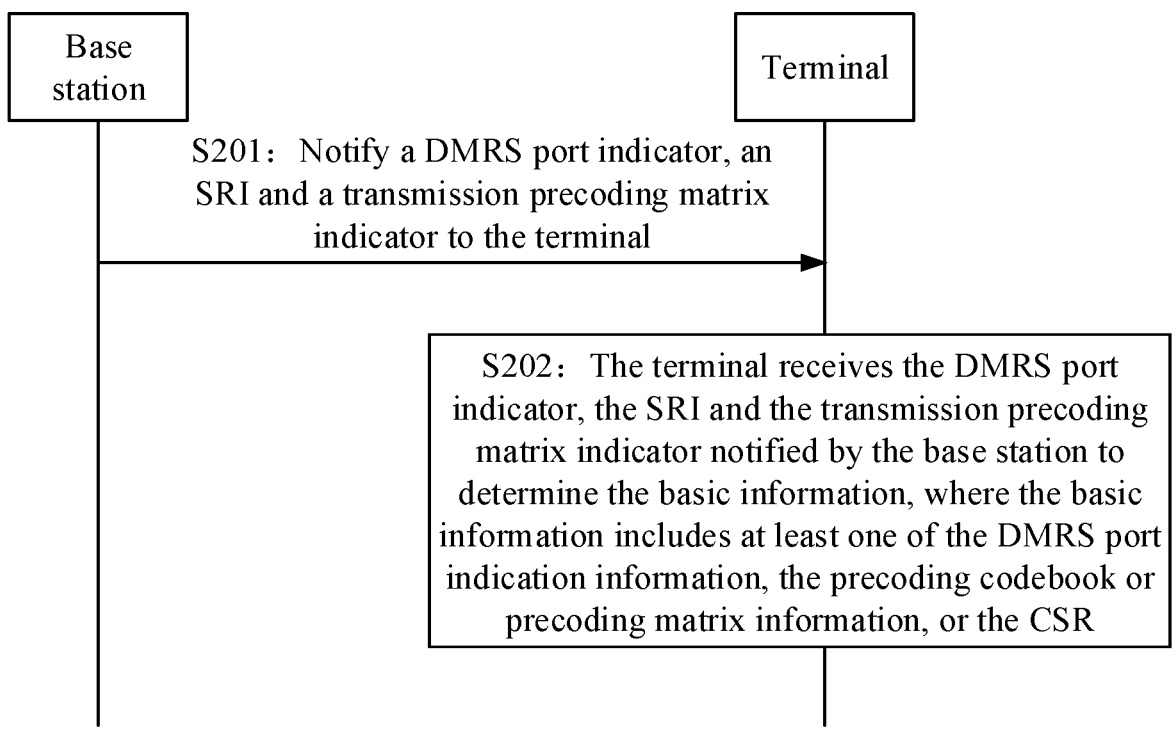
FIG. 2 is a schematic diagram illustrating interaction between a base station and a terminal according to an embodiment of the present disclosure.

FIG. 2 is a schematic diagram illustrating interaction between a base station and a terminal according to an embodiment of the present disclosure. S201 is substantially an indication method on a base station. This step is described below.

In S201, a DMRS port indicator, an SRI and a transmission precoding matrix indicator are notified to the terminal.

In practical application, when the UE (terminal) has multiple antenna panels and each antenna panel has multiple antenna ports, since radio frequency links of different antenna panels are generally independent from each other, analog beams transmitted by different panels of the UE may be different from each other and the multiple antenna panels can transmit reference signals or data simultaneously.

In this embodiment, the base station may configure a sounding reference signal (SRS) resource set for a UE through Radio Resource Control (RRC) signaling. The SRS resource set is used for codebook-based uplink transmission. The SRS resource set may contain multiple SRS resources. Each SRS resource may correspond to an antenna panel of one UE. Each SRS resource may be configured with a separate spatial-relation information parameter (SRS-SpatialRelationInfo) indicating a beam used for the UE to transmit the SRS resource. After the UE transmits the SRS resource set, the base station needs to schedule transmission of a physical uplink shared channel (PUSCH) through downlink control information format (DCI format) 0_1.

When scheduling the PUSCH, the base station may indicate the SRI representing the resource index of an SRS so that the UE needs to transmit the PUSCH according to the beam or panel of the indicated SRS resource. Meanwhile, the base station needs to indicate a TPMI for a precoding operation of multiple ports in the panel corresponding to the SRS resource.

Therefore, in this embodiment, the base station may notify the DMRS port indicator, the SRI and the transmission precoding matrix indicator to the terminal to notify basic information to the terminal. The basic information includes at least one of the DMRS port indication information, the precoding codebook or precoding matrix information, or the CSR.

However, it is to be noted that in this embodiment, the basic information such as the DMRS port indication information, the precoding codebook or precoding matrix information, or the CSR is determined based on a value of the SRI.

Specifically, in this embodiment, the corresponding basic information may be determined based on the size of value R corresponding to the SRI. The value R denotes the number of SRS resources or the number of RSs contained in the spatial information parameter(s) of the corresponding SRS resource.

In this embodiment, multiple separate indicators about precoding information and the number of layers may be notified to the UE in the DCI completely separately. However, such an operation incurs too much physical-layer signaling overhead and causes the complexity of the UE to be greatly increased. To reduce the DCI overhead, it is feasible to restrict a combination of multiple indicators about precoding information and the number of layers corresponding to multiple UE panels. That is, in this embodiment, the base station may configure a codebook subset restriction for the UE. The codebook subset restriction is applied to a combination of multiple indicators about precoding information and the number of layers. In this manner, when the value R corresponding to the SRI is greater than 1 (that is, when two or more SRS resources are indicated), a CSR applied to a combination of multiple indicators about precoding information and the number of layers is selected to restrict a combination of multiple indicators about precoding information and the number of layers corresponding to the multiple UE panels.

Here it is to be noted that a CSR is also configured for the SRI when the value R corresponding to the SRI is 1. The CSR is used for restricting selection of an indicator about precoding information and the number of layers when the SRI corresponds to one SRS resource, not involving a combination of multiple indicators about precoding information and the number of layers.

Moreover, to reduce the UE complexity and the CSR overhead, in this embodiment, it is feasible to specify that when R>1, the base station notifies multiple precoding matrices in the DCI and all columns of the notified precoding matrices have the same number of non-zero elements. Thus, the indicated precoding attributes of the multiple panels of the UE have to be the same. That is, among the multiple TPMIs indicated to the UE, the number of non-zero elements in one column of one TPMI is the same as the number of non-zero elements in one column of another TPMI. It is to be understood that in a precoding matrix, the number of non-zero elements represents the transmission capability of the UE. For example, $$TPMI = \frac{1}{\sqrt{2}}\begin{bmatrix}1\\0\end{bmatrix}$$

represents non-coherent transmission while $$TPMI = \frac{1}{\sqrt{2}}\begin{bmatrix}1\\1\end{bmatrix}$$

represents full coherent transmission. It is thus specified that in the multiple panels of the UE, either coherent transmissions or non-coherent transmission is performed. With such a specification, the precoding attributes of different panels have to be the same, and the CSR may not be required for restriction (of course, the CSR may be used for restriction at the same time).

In this embodiment, the base station may configure multiple sets of CSRs for the UE. The application of the CSRs actually depends on the indication of the SRI. For example, the base station may configure two sets of codebook subset restrictions for the UE through higher-layer signaling. One is used for single-panel transmission and the other one is used for multi-panel transmission. The application of a codebook subset restriction, however, actually depends on the number of SRS resources indicated by an SRI. Specifically, when the SRI indicated in the DCI corresponds to one SRS resource, the first set of CSRs is used, and when the SRI indicated in the DCI corresponds to two or more SRS resources, the second set of CSRs is used.

Optionally, the base station may configure one set of CSRs for each value of the SRI. In this manner, the flexibility is the highest, and the base station can even make different codebook subset restrictions on different panels of the UE.

In this embodiment, to further reduce the UE complexity, it is feasible to redesign a codebook for multi-panel transmission, and the new codebook is different from the codebook for the original single-panel transmission. Thus, when R corresponding to the SRI is greater than 1, the corresponding codebook for multi-panel transmission is selected. In this embodiment, different codebooks may be designed for different values R. That is, in this embodiment, when R is greater than 1, a codebook corresponding to the value R is selected, and then a transmit precoding matrix is determined based on the transmission precoding matrix indicator and the codebook corresponding to the value R.

In this embodiment, when R>1, the number of rows of the precoding matrix in the selected codebook is P*R. P*R indicates that there are P*R ports. The P*R ports sequentially correspond to the rows of the precoding matrix. P denotes the number of ports configured for each SRS resource corresponding to the SRI. For example, in a precoding matrix containing 4 (2*2) rows, the first row to the fourth row sequentially correspond to port 0 to 3. In the two antenna panel structures shown in FIG. 3, the four ports of the two antenna panels are 0 to 3 in sequence. In this case, the first two rows of the precoding matrix correspond to the first SRS resource and are from the first panel, and the second two rows of the precoding matrix correspond to the second SRS resource and are from the second panel. In the two antenna panel structures shown in FIG. 4, the four ports of the two antenna panels are 0, 2, 1 and 3 in sequence. In this case, the first row and the third row of the precoding matrix correspond to the first SRS resource and are from the first panel, and the second row and the fourth row of the precoding matrix correspond to the second SRS resource and are from the second panel.

Moreover, in an example of this embodiment, in each column of the precoding matrix in the codebook, elements 0 occupy a proportion of at least $$\left(1 - \frac{1}{R}\right).$$

That is, when one panel transmits one layer of data, other panels do not transmit data at this layer.

Moreover, if the first half of the ports in the precoding matrix belong to the first panel and the second half of the ports in the precoding matrix belong to the second panel, then when the number of SRS resources corresponding to the SRI or the number of RSs contained in the spatial information parameter(s) of the corresponding SRS resource is greater than 1, among elements in each column of the precoding matrix in the codebook, at least the first half of the elements are 0 or at least the second half of the elements are 0.

In an example of this embodiment, to restrict the number of candidate precoding matrices, it is feasible to specify that all columns of the precoding matrices in the codebook have the same number of non-zero elements.

Moreover, in an example of this embodiment, in the precoding matrix in the codebook, the P*R ports may be sequentially and equally divided into four groups. Elements corresponding to ports in at least odd-numbered port groups are all 0 or elements corresponding to ports in at least even-numbered port groups are all 0.

In an example of this embodiment, when R=2, spatial-relation information of first P ports corresponding to the precoding matrix is from the first of the SRS resources indicated by the SRI or from the first of the RSs contained in the spatial information parameter(s) of the SRS resource indicated by the SRI. Spatial-relation information of second P ports corresponding to the precoding matrix is from the second of the SRS resources indicated by the SRI or from the second of the RSs contained in the spatial information parameter(s) of the SRS resource indicated by the SRI.

In an example of this embodiment, when R=2, the 2P ports may be sequentially divided into four groups. Spatial-relation information of P ports whose port numbers are in even-numbered groups of the four groups corresponding to the precoding matrix is from the first of the SRS resources indicated by the SRI or from the first of the RSs contained in the spatial information parameter(s) of the SRS resource indicated by the SRI. Spatial-relation information of P ports whose port numbers are in odd-numbered groups of the four groups corresponding to the precoding matrix is from the second of the SRS resources indicated by the SRI or from the second of the RSs contained in the spatial information parameter(s) of the SRS resource indicated by the SRI.

In an example of this embodiment, when R=2, at least one precoding matrix among the precoding matrices in the codebook is a diagonal commutative matrix of another precoding matrix among the precoding matrices in the codebook.

It is to be noted that the diagonal commutative matrix refers to a matrix obtained in the following manner: rows of the precoding matrix containing P*R rows are divided into four groups, and in the case where the number of columns containing non-zero elements that belong to even-numbered groups in the precoding matrix containing P*R rows is T1, X elements in the T1 columns, in the upper left corner and in the even-numbered groups in the precoding matrix containing P*R rows are transferred to positions of elements in the T1 columns, in the lower right corner and in odd-numbered groups in the precoding matrix containing P*R rows; in the case where the number of columns containing non-zero elements that belong to odd-numbered groups in the precoding matrix containing P*R rows is T2, Y elements in the T2 columns, in the lower right corner and in the odd-numbered groups in the precoding matrix containing P*R rows are transferred to positions of elements in the T2 columns, in the upper left corner and in even-numbered groups in the precoding matrix containing P*R rows, where the obtained matrix is a diagonal commutative matrix of the precoding matrix containing P*R rows; or the diagonal commutative matrix refers to a matrix obtained in the following manner: X elements in the upper left corner of the precoding matrix are placed in the lower right corner of the precoding matrix, and Y elements in the lower right corner of the precoding matrix are placed in the upper left corner of the precoding matrix, where the obtained matrix is a diagonal commutative matrix of the precoding matrix. X and Y are positive integers. For example. FIG. 5 shows two diagonal commutative matrices.

In an example of this embodiment, when R>1 and the number of non-zero elements in each column of the precoding matrix in the codebook is P, vectors composed of non-zero elements in columns of the precoding matrix are orthogonal to each other.

It is to be noted that in an example of this embodiment, when R=2 and half of elements in each column of the precoding matrix are non-zero elements, an attribute of a phase coefficient represented by an element in the upper left corner of the precoding matrix is the same as or opposite to an attribute of a phase coefficient represented by an element in the lower right corner of the precoding matrix. It is to be noted that attributes of phase coefficients represented by elements are the same in the following manner: the elements are each a real number or are each an imaginary number; attributes of phase coefficients represented by elements are opposite to each other in the following manner: one element of the elements is a real number and another element of the elements is an imaginary number; the phase coefficient includes a phase compensated in the second direction of polarization.

It is to be understood that in practical application, when R>1, at least two transmission layers are transmitted from different UE panels. In this case, the allocation of DMRS ports is different from that in the case of one UE panel. To save DMRS overhead, it is a good choice to allocate port 0 and port 1 to a UE. However, when R>1, two transmission layers are from two different panels. The two different panels may have different time-frequency offsets, so port 0 and port 1 are no longer suitable. Since port 0 and port 1 are code-divided, in a code-division multiplexing (CDM) group, different time-frequency offsets may result in reduced demodulation performance. Therefore, in an example of this embodiment, when R>1, the number of DMRS ports indicated by the DMRS port indication information should be at least 2, or the case where the number of transmission layers is 1 should not be included in a precoding codebook.

Moreover, when R>1, multiple layers occupy at least two DMRS CDM groups. When R=1, there is no such restriction.

Moreover, in this embodiment, different Rs may be configured to correspond to different DMRS port mappings.

That is, different Rs correspond to different DMRS port mapping tables. That is, different Rs correspond to different port mapping candidate values. The DMRS port mapping table corresponding to K transmission layers when R>1 is different from the DMRS port mapping table corresponding to K transmission layers when R=1. Generally, when R>1, the DMRS port mapping table does not include the case where multiple layers only occupy a single DMRS CDM group.

Correspondingly, as shown in FIG. 2, the method of the terminal is essentially an information determination method corresponding to the indication method performed by the base station. The method of the terminal shown in FIG. 2 includes the step below.

In S202, the terminal receives the DMRS port indicator, the SRI and the transmission precoding matrix indicator notified by the base station to determine the basic information. The basic information includes at least one of the DMRS port indication information, the precoding codebook or precoding matrix information, or the CSR.

It is to be noted that in this embodiment, the basic information such as the DMRS port indication information, the precoding codebook or precoding matrix information, or the CSR is determined by the UE based on a value of the SRI.

Specifically, in this embodiment, the corresponding basic information may be determined by the UE based on the size of value R corresponding to the SRI. The value R denotes the number of SRS resources or the number of RSs contained in the spatial information parameter(s) of the corresponding SRS resource.

In an example of this embodiment, when R>1, the CSR selected by the UE is a CSR applied to a combination of multiple indicators about precoding information and the number of layers.

In an example of this embodiment, when R>1, the UE may receive multiple precoding matrices notified in DCI (all columns of the notified precoding matrices have the same number of non-zero elements).

In an example of this embodiment, when R>1, the UE may select a codebook corresponding to the value R and then determines a transmit precoding matrix based on the transmission precoding matrix indicator and the codebook corresponding to the value R.

In an example of this embodiment, when R>1, the number of rows of the precoding matrix in the codebook selected by the UE is P*R. P*R indicates that there are P*R ports. The P*R ports sequentially correspond to the rows of the precoding matrix. P denotes the number of ports configured for each SRS resource corresponding to the SRI.

In the preceding example in which the number of rows of the precoding matrix in the codebook selected by the UE is P*R, in each column of the precoding matrix in the codebook, elements 0 occupy a proportion of at least $$\left(1 - \frac{1}{R}\right).$$

Moreover, in the preceding example, all columns of the precoding matrix in the codebook may contain the same number of non-zero elements.

In the preceding example in which the number of rows of the precoding matrix in the codebook selected by the UE is P*R, among elements in each column of the precoding matrix in the codebook, at least the first half of the elements are 0 or at least the second half of the elements are 0 Alternatively, in the precoding matrix in the codebook, the P*R ports may be sequentially and equally divided into four groups. Elements corresponding to ports in at least odd-numbered port groups are all 0 or elements corresponding to ports in at least even-numbered port groups are all 0.

In the preceding example in which the number of rows of the precoding matrix in the codebook selected by the UE is P*R, when R=2, spatial-relation information of first P ports corresponding to the precoding matrix is from the first of the SRS resources indicated by the SRI or from the first of the RSs contained in the spatial information parameter(s) of the SRS resource indicated by the SRI. Spatial-relation information of second P ports corresponding to the precoding matrix is from the second of the SRS resources indicated by the SRI or from the second of the RSS contained in the spatial information parameter(s) of the SRS resource indicated by the SRI.

In the preceding example in which the number of rows of the precoding matrix in the codebook selected by the UE is P*R, when R=2, the 2P ports may be sequentially divided into four groups. Spatial-relation information of P ports whose port numbers are in even-numbered groups of the four groups corresponding to the precoding matrix is from the first of the SRS resources indicated by the SRI or from the first of the RSs contained in the spatial information parameter(s) of the SRS resource indicated by the SRI. Spatial-relation information of P ports whose port numbers are in odd-numbered groups of the four groups corresponding to the precoding matrix is from the second of the SRS resources indicated by the SRI or from the second of the RSs contained in the spatial information parameter(s) of the SRS resource indicated by the SRI.

In the preceding example in which the number of rows of the precoding matrix in the codebook selected by the UE is P*R, when R=2, at least one precoding matrix among the precoding matrices in the codebook is a diagonal commutative matrix of another precoding matrix among the precoding matrices in the codebook.

It is to be noted that the diagonal commutative matrix refers to a matrix obtained in the following manner: rows of the precoding matrix containing P*R rows are divided into four groups, and in the case where the number of columns containing non-zero elements that belong to even-numbered groups in the precoding matrix containing P*R rows is T1, X elements in the T1 columns, in the upper left corner and in the even-numbered groups in the precoding matrix containing P*R rows are transferred to positions of elements in the T1 columns, in the lower right corner and in odd-numbered groups in the precoding matrix containing P*R rows; in the case where the number of columns containing non-zero elements that belong to odd-numbered groups in the precoding matrix containing P*R rows is T2, Y elements in the T2 columns, in the lower right corner and in the odd-numbered groups in the precoding matrix containing P*R rows are transferred to positions of elements in the T2 columns, in the upper left corner and in even-numbered groups in the precoding matrix containing P*R rows, where the obtained matrix is a diagonal commutative matrix of the precoding matrix containing P*R rows; or the diagonal commutative matrix refers to a matrix obtained in the following manner: X elements in the upper left corner of the precoding matrix are placed in the lower right corner of the precoding matrix, and Y elements in the lower right corner of the precoding matrix are placed in the upper left corner of the precoding matrix, where the obtained matrix is a diagonal commutative matrix of the precoding matrix. X and Y are positive integers.

In an example of this embodiment, when R>1 and the number of non-zero elements in each column of the precoding matrix in the codebook is P, vectors composed of non-zero elements in columns of the precoding matrix in the codebook are orthogonal to each other.

It is to be noted that in an example of this embodiment, when R=2 and half of elements in each column of the precoding matrix are non-zero elements, an attribute of a phase coefficient represented by an element in the upper left corner of the precoding matrix is the same as or opposite to an attribute of a phase coefficient represented by an element in the lower right corner of the precoding matrix. It is to be noted that attributes of phase coefficients represented by elements are the same in the following manner: the elements are each a real number or are each an imaginary number; attributes of phase coefficients represented by elements are opposite to each other in the following manner: one element of the elements is a real number and another element of the elements is an imaginary number; the phase coefficient includes a phase compensated in a direction of polarization.

It is to be understood that in practical application, when R>1, at least two transmission layers are transmitted from different UE panels. In this case, the allocation of DMRS ports is different from that in the case of one UE panel. To save DMRS overhead, it is a good choice to allocate port 0 and port 1 to a UE. However, when R>1, two transmission layers are from two different panels. The two different panels may have different time-frequency offsets, so port 0 and port 1 are no longer suitable. Since port 0 and port 1 are code-divided, in a CDM group, different time-frequency offsets may result in reduced demodulation performance. Therefore, in an example of this embodiment, when R>1, the number of DMRS ports indicated by the DMRS port indication information received by the UE should be at least 2, or the case where the number of transmission layers is 1 should not be included in a precoding codebook.

Moreover, when R>1, multiple layers occupy at least two DMRS CDM groups. When R=1, there is no such restriction. Moreover, in this embodiment, different Rs may be configured to correspond to different DMRS port mappings. That is, different Rs correspond to different DMRS port mapping tables.

In fact, the standards on the terminal are fully in conformity with the standards on the base station. The terminal can correspondingly determine information such as the DMRS port indication information, the precoding codebook or precoding matrix information, or the CSR simply according to each indicator transmitted by the base station. Then the terminal can transmit the PUSCH according to the beam or panel of the indicated SRS resource.

In the indication method and information determination method provided in this embodiment of the present disclosure, the DMRS port indicator, the SRI and the transmission precoding matrix indicator are notified to the terminal so that terminal can determine the basic information (the basic information includes at least one of the DMRS port indication information, the precoding codebook or precoding matrix information, or the CSR, and the basic information is determined based on the value of the SRI) required for codebook-based uplink transmission. In this manner, the terminal can implement data transmission in a single-panel or multiple-panel case according to the requirements of the base station. That is, the base station can notify the DMRS mapping information, the CSR, the precoding codebook and the like implicitly according to the dynamic indication of the SRI, thereby enabling the terminal to dynamically switch between a single beam and multiple beams effectively. In this manner, multi-panel transmission can be supported, and dynamic indication between single-panel transmission and multi-panel transmission can be flexibly supported.

Embodiment Two

When a UE has multiple antenna panels and each antenna panel has multiple antenna ports, since radio frequency links of different antenna panels are generally separate from each other, analog beams transmitted by different panels of the UE may be different from each other and the multiple antenna panels can transmit reference signals or data simultaneously. A base station may configure one SRS resource set for a UE through RRC signaling. The SRS resource set is used for codebook-based uplink transmission. The SRS resource set may contain multiple SRS resources. Each SRS resource may correspond to an antenna panel of one UE. Each SRS resource may be configured with a separate spatial-relation information parameter indicating a beam used for the UE to transmit the SRS resource. After the UE transmits the SRS resource set, the base station needs to schedule transmission of a PUSCH through DCI format 0_1. When scheduling the PUSCH, the base station may indicate the SRI representing the resource index of an SRS so that the UE needs to transmit the PUSCH according to the beam or panel of the indicated SRS resource. Meanwhile, the base station needs to indicate a TPMI for a precoding operation for multiple ports in the panel corresponding to the SRS resource.

For example, the UE has two antenna panels, and each antenna panel has two antenna ports. See FIG. 3. If the base station instructs the UE to transmit a PUSCH simultaneously by using two antenna panels, the number of antenna ports of the UE is actually 4. A straightforward scheme is to make use of a codebook for four antenna ports in the related art. However, phase compensation cannot be performed between two antenna panels. That is, coherent transmission cannot be performed between two antenna panels. Thus, the codebook for four antenna ports in the related art is not applicable.

For two-panel transmission, since transmission by one panel is separate from transmission by the other panel, the base station may indicate two separate indicators about precoding information and the number of layers to the UE. The two separate pieces of precoding information are both based on the codebook for two antennas. Table 1-1.1 and Table 1-1.2 list 1-layer data transmission and 2-layer data transmission respectively in the case of two antennas. For each panel, the base station needs to indicate information about precoding and layer in the DCI. See Table 1-1.3. That is, each panel needs four bits when notifying the information about precoding and layer.

TABLE 1-1.1

| TPMI Index | TPMI Index from Left to Right | | | |
|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ |
| | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

TABLE 1-1.2

| TPMI Index | TPMI Index from Left to Right | | |
|---|---|---|---|
| 0-2 | $\frac{1}{\sqrt{2}}\begin{bmatrix}1 & 0\\0 & 1\end{bmatrix}$ | $\frac{1}{\sqrt{2}}\begin{bmatrix}1 & 1\\1 & -1\end{bmatrix}$ | $\frac{1}{\sqrt{2}}\begin{bmatrix}1 & 1\\j & -j\end{bmatrix}$ |

TABLE 1-1.3

| Index | Condition of Codebook Subset |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |
| 4 | 1 layer: TPMI = 3 |
| 5 | 1 layer: TPMI = 4 |
| 6 | 1 layer: TPMI = 5 |
| 7 | 2 layers: TPMI = 1 |
| 8 | 2 layers: TPMI = 2 |
| 9-15 | Reserved |

However, in the case where two indicators about precoding information and the number of layers are notified, separately, to the UE in the DCI, the physical-layer signaling overhead, that is, 8 bits, is excessively large, and the UE complexity is greatly increased because the UE needs to consider a combination of any two TPMIs. To reduce the DCI overhead, it is feasible to restrict a combination of indicators about precoding information and the number of layers corresponding to multiple UE panels. That is, the base station configures one codebook subset restriction for the UE through higher-layer signaling. This codebook subset restriction is applied to a combination of indicators about precoding information and the number of layers. That is, the base station uses the CSR to tell the user that when the base station notifies multiple indicators about precoding information and the number of layers by using the DCI, one indicator about precoding information and the number of layers and another indicator about precoding information and the number of layers cannot be notified by the base station simultaneously, and a combination of the two indicators about precoding information and the number of layers is invalid.

For example, the UE has two panels, and the base station uses an 81-bit CSR to notify the user whether a combination of the indicator about precoding information and the number of layers for the first panel and the indicator about precoding information and the number of layers for the second panel is valid. This is because the indicator about precoding information and the number of layers for the first panel requires nine indexes, the indicator about precoding information and the number of layers for the second panel also requires nine indexes, and the combination of the separate indicators about precoding information and the number of layers for the two panels include 81 states. As listed in Table 1-1.4, the CSR occupies a total of 81 bits. The bit value 0 indicates that the two indicators about precoding information and the number of layers are invalid. For example, as indicated in the first row of the table, the first bit in the CSR is 0, that is, a combination of 1 layer and TPMI=0 for the first panel and 1 layer and TPMI=0 for the second panel is invalid.

TABLE 1-1.4

| CSR Bit Value | First Indicator about Precoding Information and Number of Layers | Second Indicator about Precoding Information and Number of Layers |
|---|---|---|
| 0 | 1 layer: TPMI = 0 | 1 layer: TPMI = 0 |
| 1 | 1 layer: TPMI = 0 | 1 layer: TPMI = 1 |
| 0 | 1 layer: TPMI = 0 | 1 layer: TPMI = 2 |
| 0 | 1 layer: TPMI = 0 | 1 layer: TPMI = 3 |
| 1 | 1 layer: TPMI = 0 | 1 layer: TPMI = 4 |
| 1 | 1 layer: TPMI = 0 | 1 layer: TPMI = 5 |
| 0 | 1 layer: TPMI = 1 | 1 layer: TPMI = 0 |
| 0 | 1 layer: TPMI = 1 | 1 layer: TPMI = 1 |
| 1 | 1 layer: TPMI = 1 | 1 layer: TPMI = 2 |
| 0 | 1 layer: TPMI = 1 | 1 layer: TPMI = 3 |
| 1 | 1 layer: TPMI = 1 | 1 layer: TPMI = 4 |
| 0 | 1 layer: TPMI = 1 | 1 layer: TPMI = 5 |
| ... | ... | ... |

When indicating multiple indicators about precoding information and the number of layers in the DCI, it is only necessary to consider a valid combination of indicators about precoding information and the number of layers. That is, the DCI overhead depends on the number of valid combinations of indicators about precoding information and the number of layers. If the number of bits whose value is 1 in the CSR is 16, one combination is required to be selected from 16 valid combinations of indicators about precoding information and the number of layers by using merely four bits in the DCI. In this case, the base station notifies, in the DCI, two indexes of combinations of indicators about precoding information and the number of layers, and one index represents two indicators about precoding information and the number of layers.

To further reduce the UE complexity and the bit overhead of the CSR, it may be directly specified that the indicated precoding attributes of the multiple panels of the UE have to be the same. That is, among the multiple TPMIs indicated to the UE, the number of non-zero elements in one column of one TPMI is the same as the number of non-zero elements in one column of another TPMI. The number of non-zero elements represents the transmission capability of the UE. For example, $$TMPI = \frac{1}{\sqrt{2}}\begin{bmatrix}1\\0\end{bmatrix}$$

represents non-coherent transmission while $$TPM1 = \frac{-1}{\sqrt{2}}\begin{bmatrix}1\\1\end{bmatrix}$$

represents full coherent transmission. It is thus specified that in the multiple panels of the UE, either coherent transmissions or non-coherent transmission is performed. With such a specification, the precoding attributes of different panels have to be the same, notification through the signaling of the CSR is not required.

As shown in FIG. 3, when the two panels are both used for data transmission, actually four ports are used. Thus, the precoding matrix formed by combining the two notified TPMIs contains four rows. For example, if the indicator about precoding information and the number of layers for the first panel is 1 layer: TPMI=0, and the indicator about precoding information and the number of layers for the second panel is 1 layer: TPMI=1, then the final precoding matrix is actually $$\frac{1}{\sqrt{M}}\begin{bmatrix}10\\00\\00\\01\end{bmatrix}$$

such that the first row and the second row of the precoding matrix are applied to the first panel, that is, port 0 and port 1; and the third row and the fourth row of the precoding matrix are applied to the second panel, that is, port 2 and port 3.

Embodiment Three

As shown in embodiment two, a base station may configure one SRS resource set for one UE through RRC signaling. The SRS resource set is used for codebook-based uplink transmission. The SRS resource set may contain multiple SRS resources. Each SRS resource may correspond to an antenna panel of one UE. Each SRS resource may be configured with a separate spatial-relation information parameter indicating a beam used for the UE to transmit the SRS resource. After the UE transmits the SRS resource set, the base station needs to schedule transmission of a PUSCH through DCI format 0_1. When scheduling the PUSCH, the base station may indicate the SRI representing the resource index of an SRS so that the UE needs to transmit the PUSCH according to the beam or panel of the indicated SRS resource.

To support dynamic switch between multi-panel transmission and single-panel transmission, the base station may indicate one SRS resource or multiple SRS resources, such as two, by using an SRI in the DCI. One SRS resource corresponds to single-panel transmission, multiple SRS resources correspond to a multi-panel transmission, and each resource is configured with two ports. For example, the value of a 2-bit SRI is listed in Table 1-2.1. It is assumed that the SRS resource set configured by the base station through RRC signaling for the UE to perform codebook-based transmission includes two resources: resource 0 and resource 1.

TABLE 1-2.1

| SRI Index Value | SRS Resource Index |
|---|---|
| 0 | 0 |
| 1 | 1 |
| 2 | 0, 1 |
| 3 | Reserved |

If the value of the SRI indicated in the DCI corresponds to one SRS resource, for example, SRI=0 or SRI=1, then single-panel transmission is performed. In this case, the function of the CSR is to restrict some indicators about precoding information and the number of layers. However, if the value of the SRI indicated in the DCI corresponds to two SRS resources, for example, SRI=2, then two-panel transmission is performed. In this case, the function of the CSR is to restrict some combination of indicators about precoding information and the number of layers, as described in embodiment two. In this case, the CSR is applied to multiple combination of indicators about precoding information and the number of layers. Therefore, to improve the flexibility of the codebook subset restriction, for the codebook-based UL transmission, the base station configures multiple sets of codebook subset restrictions for the UE through higher-layer signaling, and the practical application of the codebook subset restriction depends on the indication of the SRI. Further, the base station configures two sets of codebook subset restrictions for the UE through higher-layer signaling. One is used for single-panel transmission and the other one is used for multi-panel transmission. The application of a codebook subset restriction, however, actually depends on the number of SRS resources indicated by the SRI. In an example, the base station configures two sets of CSRs for the UE through higher-layer signaling; when the SRI indicated in the DCI corresponds to one SRS resource, the first set of CSRs is used, and when the SRI indicated in the DCI corresponds to two or more SRS resources, the second set of CSRs is used.

Optionally, the base station may configure multiple sets of codebook subset restrictions for the UE through higher-layer signaling, and each set corresponds to one value of the SRI. In this manner, the flexibility is the highest, and the base station can even make different codebook subset restrictions on different panels of the UE.

Embodiment Four

Compared with embodiment three, optionally, spatial-relation information parameters of some SRS resources in an SRS resource set configured through RRC signaling may contain multiple RS resources, or some SRS resources correspond to multiple spatial information parameters. These SRS resources are equivalent to multiple beams, that is, correspond to multiple panels. Therefore, a base station allocates multiple sets of codebook subset restrictions to a UE through higher-layer signaling. The application of a codebook subset restriction actually depends on the indication of an SRI. When a spatial-relation information parameter in one SRS resource corresponding to the SRI indicated in DCI contains one reference signal (RS) or when the SRS resource corresponds to one spatial information parameter, one set of CSRs configured by a higher layer is referred to as CSR1. When the spatial-relation information parameter of one SRS resource indicated by SRI in DCI contains multiple RSs or when the SRS resource corresponds to multiple spatial information parameters, another set of CSRs configured by a higher layer is referred to as CSR2. CSR1 and CSR2 may be configured separately and used for single-panel transmission and two-panel transmission respectively. That is, when an SRI corresponds to a different number of SRS resources or when spatial information parameters of SRS resources corresponding to the SRI contain a different number of RSs, the SRI corresponds to a different CSR. Specifically, the function of CSR2 is to restrict a combination of multiple indicators about precoding information and the number of layers, and CSR2 is used for multi-panel transmission.

In summary, the application of a codebook subset restriction actually depends on the indication of an SRI. Further, the selection of the CSR depends on the number R of SRS resources corresponding to the SRI or the number of RSs contained in the spatial information parameter(s) of the SRS resource corresponding to the SRI. When R is greater than 1, the corresponding CSR is applied to a combination of multiple indicators about precoding information and the number of layers. In this case, the base station often indicates multiple TPMIs to the UE by using the DCI. To reduce the complexity, the number of non-zero elements in each column of one TPMI is the same as the number of non-zero elements in each column of another TPMI.

When the number of SRS resources corresponding to the SRI or the number R of RSs contained in the spatial information parameter(s) of the corresponding SRS resource is greater than 1, elements of the corresponding CSR may be large in number, so execution of the CSR may be performed in a manner of RRC signaling plus medium access control (MAC) control unit (CE).

Specifically, through the RRC signaling, a A2 combination of indicators about precoding information and the number of layers is selected from a A1 combination of indicators about precoding information and the number of layers, then through the MAC CE, a A3 combination of indicators about precoding information and the number of layers is selected from the A2 combination of indicators about precoding information and the number of layers, and finally, through the DCI, one combination of indicators about precoding information and the number of layers is selected from the A3 combination of indicators about precoding information and the number of layers. That is, the DCI overhead depends on A3.

Optionally, through the RRC signaling, codebook subset restriction is performed on multiple TPMIs (not multiple combination of TPMIs) separately, then through the MAC CE, a multiple combinations of the RRC-restricted valid TPMIs are selected, and finally, through the DCI, one combination of TPMIs is selected from the multiple combinations of the valid TPMIs selected through the MAC CE. The DCI overhead depends on the number of combinations of valid TPMIs selected through the MAC CE.

Embodiment Five

As shown in FIG. 3, if a base station instructs a UE to transmit a PUSCH simultaneously by using two antenna panels, the number of antenna ports of the UE is actually 4. A straightforward scheme is to make use of a codebook for four antennas in the related art. However, phase compensation cannot be performed between two antenna panels. That is, coherent transmission cannot be performed between two antenna panels. Thus, the codebook for four antenna ports in the related art is not applicable.

For two-panel transmission, since transmission by one panel is separate from transmission by the other panel, the base station may indicate two separate indicators about precoding information and the number of layers to the UE. The two pieces of precoding information are both based on a codebook for two antennas. However, this scheme of indicating two indicators about precoding information and the number of layers for two antennas greatly increases the DCI overhead.

According to the scheme of embodiment two, the CSR scheme is used to restrict a combination of two indicators about precoding information and the number of layers. In this scheme, the task of controlling the DCI overhead is handed over to the base station. However, this may still not satisfy the UE requirement for low complexity. This is because the UE is designed to be capable of supporting a combination of all precoding of two panels. To further reduce the UE complexity, it is feasible to redesign a codebook for multi-panel transmission, that is, the new codebook is different from the codebook for the original single-panel transmission.

To support dynamic switch between multi-panel transmission and single-panel transmission, the base station may indicate one SRS resource or multiple SRS resources by using an SRI in the DCI. The one SRS resource or the multiple SRS resources correspond to single-panel transmission and multi-panel transmission respectively. Alternatively, to support dynamic switch between multi-panel transmission and single-panel transmission, the base station may determine whether spatial-relation information parameters configured in the SRS resources corresponding to the SRI contain one RS or multiple RSs. The one RS or the multiple RSs correspond to single-panel transmission and multi-panel transmission respectively. Here the RS may be single side band (SSB), channel state information reference signal (CSI-RS) or SRS. As can be seen, in the example of FIG. 3, the number of ports per SRS resource should be configured to be 2. When the SRI notified in the DCI corresponds to one SRS resource, and the spatial-relation information parameter of the SRS resource includes one RS, single-panel transmission is performed, and the used codebook is a single-panel codebook that may be identified as codebook1. When the SRI notified in the DCI corresponds to multiple SRS resources, or the spatial-relation information parameters of one SRS resource corresponding to the SRI contain multiple RSs (for example, multiple SSB indexes, multiple CSI-RS resource indexes or multiple SRS resource indexes), then multi-panel transmission is performed, and all codebooks are multi-panel codebooks that may be identified as codebook2. Since single-panel transmission and multi-panel transmission are different in properties, a codebook for single-panel transmission is different from a codebook for multi-panel transmission, that is, codebook1 is different from codebook2. Therefore, the selection of a codebook for uplink transmission actually depends on the notification of the SRI in the DCI. Specifically, the selection of the codebook for uplink transmission actually depends on the number of SRS resources corresponding to the SRI or the number of RSs contained in the spatial information parameter(s) of the corresponding SRS resource. That is, when an SRI corresponds to a different number of SRS resources or when spatial information parameters of SRS resources corresponding to the SRI contain a different number of RSs, a different codebook is used for uplink transmission. That is, the selection of a codebook dynamically varies with the indication of the SRI.

Embodiment Six

As shown in FIG. 3, when two panels are both used for data transmission, actually four ports are used. Thus, the notified precoding matrix formed by two TPMIs contains four rows. The first row and the second row of the final precoding matrix are applied to the two ports of the first panel, that is, port 0 and port 1. The third row and the fourth row of the final precoding matrix are applied to the two ports of the second panel, that is, port 2 and port 3. For example, the indicator about precoding information and the number of layers for the first panel is 1 layer: [1 0]T, and the indicator about precoding information and the number of layers for the second panel is 1 layer: [0 1]T, so the final precoding matrix should actually be $$\frac{1}{\sqrt{M}} \begin{bmatrix} 10 \\ 00 \\ 00 \\ 01 \end{bmatrix}.$$

Assuming that the number of ports configured for each resource in an SRS resource set for codebook-based uplink transmission is P, then when the number of SRS resources corresponding to the SRI or the number R of RSs contained in the spatial information parameter(s) of the corresponding SRS resource is greater than 1, multi-panel transmission is performed. In this case, the number of rows of the precoding matrix in the corresponding codebook is P*R, that is, the total number of ports is P*R. In the example of FIG. 3, when P=2 and R=2, the precoding matrix contains four rows.

In this case, it can be seen that since coherent transmission cannot be performed between two panels, when multi-panel transmission is performed, at least half of elements in each column of the precoding matrix in the codebook are non-zero elements. Since the selection of a codebook for uplink transmission actually depends on the notification of the SRI in the DCI. Specifically, when the number of SRS resources corresponding to the SRI or the number of RSs contained in the spatial information parameter(s) of the corresponding SRS resource is greater than 1, among elements in each column of the precoding matrix in the codebook, at least half of the elements are 0. If R>2, in each column of the precoding matrix in the codebook, elements 0 occupy a proportion of at least $$\left(1 - \frac{1}{R}\right).$$

That is, when one panel transmits one layer of data, other panels do not transmit data at this layer.

If the antenna ports are numbered as shown in FIG. 3, that is, if the first half of the ports in the precoding matrix belong to the first panel and the second half of the ports in the precoding matrix belong to the second panel, then when the number of SRS resources corresponding to the SRI or the number of RSs contained in the spatial information parameter(s) of the corresponding SRS resource is greater than 1, among elements in each column of the precoding matrix in the codebook, at least the first half of the elements are 0 or at least the second half of the elements are 0. This is because for panel1, the first two ports are occupied, that is, the second two ports do not transmit anything for panel1, that is, the second two ports transmit elements 0 for panel1; for panel2, the second two ports are occupied, that is, the first two ports do not transmit anything for panel2, that is, the first two ports transmit elements 0 for panel2. According to such correspondence, the first two ports (port 0 and port 1) are from panel1, that is, correspond to the first two rows of the precoding matrix, and the second two ports (port 2 and port 3) are from panel2, that is, correspond to the second two rows of the precoding matrix. When the number of SRS resources corresponding to the SRI is 2, port 0 and port 1 correspond to the first of the two SRS resources indicated by the SRI, and the spatial-relation information of port 0 and port 1 is from the first of the two SRS resources indicated by the SRI; ports 2 and 3 correspond to the second of the two SRS resources indicated by the SRI, and the spatial-relation information of ports 2 and 3 is from the second of the two SRS resources indicated by the SRI. Alternatively, when the number of RSs contained in the spatial information parameter(s) of the SRS resource corresponding to the SRI is 2, port 0 and port 1 correspond to the first of the RSs contained in the spatial information parameter(s) of the SRS resource indicated by the SRI, and the spatial-relation information of port 0 and port 1 is from the first of the RSs contained in the spatial information parameter(s) of the SRS resource indicated by the SRI; port 2 and port 3 correspond to the second of the RSs contained in the spatial information parameter(s) of the SRS resource indicated by the SRI, and the spatial-relation information of port 2 and port 3 is from the second of the RSS contained in the spatial information parameter(s) of the SRS resource indicated by the SRI.

That is, when the number of SRS resources corresponding to the SRI or the number R of RSs contained in the spatial information parameter(s) of the corresponding SRS resource is 2, the transmit the beam of port 0 and port 1 and the beam of port 2 and port 3 are separately from the two SRS resources indicated by the SRI or from the two RSs contained in the spatial information parameter(s) of one SRS resource indicated by the SRI. When the number of SRS resources corresponding to the SRI or the number R of RSs contained in the spatial information parameter(s) of the corresponding SRS resource is 1, the precoding matrix may contain only two rows, that is, only two ports. In this case, the spatial information parameter(s) of the two ports is from the SRS resource corresponding to the SRI. For simplicity, the two ports from either panel may be identified as port 0 and port 1.

Generally, when the number of SRS resources corresponding to the SRI is 2, spatial-relation information of first P ports in the precoding matrix is from the first of the two SRS resources indicated by the SRI, and spatial-relation information of second P ports in the precoding matrix is from the second of the two SRS resources indicated by the SRI. Alternatively, when the number of RSs contained in the spatial information parameter(s) of the SRS resource corresponding to the SRI is 2, spatial-relation information of first P ports in the precoding matrix is from the first of the RSs contained in the spatial information parameter(s) of the SRS resource indicated by the SRI, and spatial-relation information of second P ports in the precoding matrix is from the second of the RSs contained in the spatial information parameter(s) of the SRS resource indicated by the SRI.

Therefore, the number of rows of the precoding matrix in the codebook depends on the number R of SRS resources corresponding to the SRI or the number R of RSs contained in the spatial information parameter(s) of the corresponding SRS resource. Assuming that the number of ports of each SRS resource is P, when R=1, the number of rows of the corresponding precoding matrix or each precoding matrix in the codebook is P; when R=2, the number of rows of the corresponding precoding matrix or each precoding matrix in the codebook is 2P. For example, assuming that the number of ports of each SRS resource is 2, when R=1, the number of rows of the corresponding precoding matrix or each precoding matrix in the codebook is 2; when R=2, the number of rows of the corresponding precoding matrix or each precoding matrix in the codebook is 4. That is, the number of rows of the precoding matrix is equal to P*R.

For example, in the case where each panel has 4 ports, that is, the number of ports of each SRS resource is 4, when R=1, the number of rows of the corresponding precoding matrix or each precoding matrix in the codebook is 4; when R=2, the number of rows of the corresponding precoding matrix or each precoding matrix in the codebook is 8.

Embodiment Seven

Based on the analysis of the preceding embodiments, an SRS resource set for codebook-based transmission contains N SRS resources, where N≥1. If the number of ports of each resource is P, one UE panel has P ports. For example, P=2. A base station uses an SRI in DCI to indicate selected SRS resources, the number R of SRS resources corresponding to the SRI or the number R of RSs contained in the spatial information parameter(s) of one SRS resource corresponding to the SRI. If R=1, the precoding codebook is a codebook for two antenna ports. If R=2, the precoding codebook is a codebook for four antenna ports. Apparently, different values of the SRI leads to different codebooks. When R>1, the precoding matrix in the codebook for total four antennas of two panels is composed of the two antenna precoding matrices of two panels. If the two antenna precoding matrices of the two panels are separately from a codebook for two antennas in the related art, the overhead of the TPMI field in the DCI is large. To restrict, without loss of flexibility, the number of precoding matrices in the codebook in the case where R>1, special designs are required. This embodiment mainly discusses the design of a codebook when R=2.

When R=2, each of the two panels of the UE transmits a data stream separately based on a different beam, and the number of transmission layers is at least two. In this case, the number of DMRS ports is at least 2.

7.1. It is assumed that one UE supports a maximum of two layers.

In this case, one layer of data stream, that is, one DMRS port, is transmitted from each of the two panels of the UE: 1+1.

To reduce the number of precoding matrices, reference may be made to Table 1-6.1. A two-layer two-port precoding matrix of NR is described below.

TABLE 1-6.1

Two-layer two-port codebook $$\begin{bmatrix} 1 & 0 \\ 0 & 1 \end{bmatrix} \quad \begin{bmatrix} 1 & 1 \\ 1 & -1 \end{bmatrix} \quad \begin{bmatrix} 1 & 1 \\ j & -j \end{bmatrix}$$

When R=2, the first column of the precoding matrix is from the first panel, and the second column of the precoding matrix is from the second panel. In this case, it is needed to transform the matrix into a four-port precoding matrix, that is, the precoding matrix needs four rows. The size of the precoding matrix is 4×2. Thus, the second two rows of each column of the precoding matrix corresponding to the first panel need to be inserted with elements 0, that is at port 2 and port 3 are elements 0; the first two rows of each column of the precoding matrix corresponding to the second panel need to be inserted with elements 0, that is at port 0 and port 1 are elements 0. The transformed codebook is described in Table 1-6.2 below. For simplicity, the amplitude of a precoding matrix is not given herein.

TABLE 1-6.2

Two-layer four-port codebook based on two panels $$\begin{bmatrix} Port\,0 \\ Port\,1 \\ Port\,2 \\ Port\,3 \end{bmatrix} \quad \begin{bmatrix} 1 & 0 \\ 0 & 0 \\ 0 & 0 \\ 0 & 1 \end{bmatrix} \quad \begin{bmatrix} 1 & 0 \\ 1 & 0 \\ 0 & 1 \\ 0 & -1 \end{bmatrix} \quad \begin{bmatrix} 1 & 0 \\ j & 0 \\ 0 & 1 \\ 0 & -j \end{bmatrix}$$

However, such simplification has some drawbacks. For the first panel, the precoding vectors can only be [1 0], [1 1] and [1 j] and cannot be [0 1], [1 −1] and [1 −j]. Similarly, for the second panel, the precoding vectors can only be [0 1], [1 −1] and [1 −j] and cannot be [1 0], [1 1] and [1 j]. Since the two panels have separate rows, such restrictions cause performance losses.

To extend the flexibility of the codebook, when R=2, one precoding matrix in the codebook is a diagonal commutation of another precoding matrix in the codebook. As shown in FIG. 5, the diagonal commutation means that elements in the upper left corner of a precoding matrix and elements in the lower right corner of the precoding matrix are transposed. It is to be understood that elements in the upper left corner of the precoding matrix are the precoding vector set of the first panel, and elements in the lower right corner of the precoding matrix are the precoding vector set of the second panel. After the diagonal commutation is completed, the precoding vectors of the two panels are transposed. When R=2, one precoding matrix contains two precoding vector sets (one vector is one column of the precoding matrix). The two precoding vector sets are in one-to-one correspondence with the two panels. In rows containing the non-zero elements of the precoding vectors in the first precoding vector set, the elements of the precoding vectors in the second precoding vector set are all 0.

As listed in Table 1-6.3 below, the precoding matrix in the lower row of the table is a diagonal commutative matrix of the precoding matrix in the upper row of the table. The advantage of doing so is that for a panel, different precoding vectors can be tried, compensating for the deficiency of the matrix without increasing too many precoding matrices.

TABLE 1-6.3

$$\begin{bmatrix} 1 & 0 \\ 0 & 0 \\ 0 & 0 \\ 0 & 1 \end{bmatrix} \quad \begin{bmatrix} 1 & 0 \\ 1 & 0 \\ 0 & 1 \\ 0 & -1 \end{bmatrix} \quad \begin{bmatrix} 1 & 0 \\ j & 0 \\ 0 & 1 \\ 0 & -j \end{bmatrix}$$

$$\updownarrow \quad \updownarrow \quad \updownarrow$$

$$\begin{bmatrix} 0 & 0 \\ 1 & 0 \\ 0 & 1 \\ 0 & 0 \end{bmatrix} \quad \begin{bmatrix} 1 & 0 \\ -1 & 0 \\ 0 & 1 \\ 0 & 1 \end{bmatrix} \quad \begin{bmatrix} 1 & 0 \\ -j & 0 \\ 0 & 1 \\ 0 & j \end{bmatrix}$$

7.2 It is assumed that one UE supports a maximum of four layers.

7.2.1. For two-layer transmission, each of the two panels of the UE transmits one layer of data stream, that is, one DMRS port: 1+1.

This case is the same as the case of a maximum of two layers.

7.2.2. For three-layer transmission, the two UE panels transmit two layers of data and one layer of data respectively, or transmit one layer of data and two layers of data respectively: 2+1 or 1+2.

In this case, when R=2, it is feasible to predefine such that the first column and the second column of the precoding matrix are from the first panel, and the third column of the precoding matrix is from the second panel. Since the first column and the second column of the precoding matrix correspond to the first UE panel, elements in the second two rows in the two columns should be 0 because the first panel occupies only port 0 and port 1. Since the third column of the precoding matrix corresponds to the second UE panel, elements in the first two rows in this column should be 0 because the second panel occupies only port 2 and port 3. To restrict the number of candidate precoding matrices, it is feasible to restrict that the attributes of the precoding vectors transmitted by the two panels of the UE are the same, that is, all columns of each precoding matrix corresponding to three-layer transmission contain the same number of non-zero elements. Although the flexibility of scheduling is somewhat restricted, actual channel and UE antenna attributes are conformed to. The precoding codebook obtained based on these attributes is listed in Table 1-6.4.

TABLE 1-6.4

$$\begin{bmatrix} 1 & 0 & 0 \\ 0 & 1 & 0 \\ 0 & 0 & 1 \\ 0 & 0 & 0 \end{bmatrix} \begin{bmatrix} 1 & 0 & 0 \\ 0 & 1 & 0 \\ 0 & 0 & 0 \\ 0 & 0 & 1 \end{bmatrix}$$

$$\begin{bmatrix} 1 & 1 & 0 \\ 1 & -1 & 0 \\ 0 & 0 & 1 \\ 0 & 0 & 1 \end{bmatrix} \begin{bmatrix} 1 & 1 & 0 \\ 1 & -1 & 0 \\ 0 & 0 & 1 \\ 0 & 0 & -1 \end{bmatrix} \begin{bmatrix} 1 & 1 & 0 \\ 1 & -1 & 0 \\ 0 & 0 & 1 \\ 0 & 0 & j \end{bmatrix} \begin{bmatrix} 1 & 1 & 0 \\ 1 & -1 & 0 \\ 0 & 0 & 1 \\ 0 & 0 & -j \end{bmatrix}$$

$$\begin{bmatrix} 1 & 1 & 0 \\ j & -j & 0 \\ 0 & 0 & 1 \\ 0 & 0 & 1 \end{bmatrix} \begin{bmatrix} 1 & 1 & 0 \\ j & -j & 0 \\ 0 & 0 & 1 \\ 0 & 0 & -1 \end{bmatrix} \begin{bmatrix} 1 & 1 & 0 \\ j & -j & 0 \\ 0 & 0 & 1 \\ 0 & 0 & j \end{bmatrix} \begin{bmatrix} 1 & 1 & 0 \\ j & -j & 0 \\ 0 & 0 & 1 \\ 0 & 0 & -j \end{bmatrix}$$

However, it does not conform to actual channel conditions to always restrict that the first UE panel transmits two data layers. To extend the flexibility of the codebook, when R=2, one precoding matrix in the codebook is a diagonal commutation of another precoding matrix in the codebook. As shown in FIG. 6, the diagonal commutation means that elements in the upper left corner of a precoding matrix and elements in the lower right corner of the precoding matrix are transposed. In this case, the number of layers is 3, that is, the four elements in the upper left corner and the two elements in the lower right corner are transposed. That is, X elements in the upper left corner of the precoding matrix are placed in the lower right corner of the precoding matrix, and Y elements in the lower right corner of the precoding matrix are placed in the upper left corner of the precoding matrix. X may not be equal to Y. Assuming that the precoding matrix contains Z rows, the number of all elements in the first Z/2 rows contained in the columns having non-zero elements in the first Z/2 rows of precoding matrix is X, and the number of all elements of the second Z/2 rows contained in the columns having non-zero elements in the second Z/2 rows of precoding matrix is Y.

After a diagonal commutation is performed on each precoding matrix listed in Table 1-6.4, another 10 precoding matrices are formed. Thus, in the case of three transmission layers, 20 precoding matrices are provided. Every two of the 20 precoding matrices are a diagonal commutative matrix of each other. As listed in Table 1-6.5 below, in each column, the precoding matrix in the second row of the table is a diagonal commutation of the precoding matrix in the first row of the table, the precoding matrix in the fourth row of the table is a diagonal commutation of the precoding matrix in the third row of the table, and the precoding matrix in the sixth row of the table is a diagonal commutation of the precoding matrix in the fifth row of the table.

TABLE 1-6.5

$$\begin{bmatrix} 1 & 0 & 0 \\ 0 & 1 & 0 \\ 0 & 0 & 1 \\ 0 & 0 & 0 \end{bmatrix} \begin{bmatrix} 1 & 0 & 0 \\ 0 & 1 & 0 \\ 0 & 0 & 0 \\ 0 & 0 & 1 \end{bmatrix}$$

$$\begin{bmatrix} 1 & 0 & 0 \\ 0 & 0 & 0 \\ 0 & 1 & 0 \\ 0 & 0 & 1 \end{bmatrix} \begin{bmatrix} 0 & 0 & 0 \\ 1 & 0 & 0 \\ 0 & 1 & 0 \\ 0 & 0 & 1 \end{bmatrix}$$

$$\begin{bmatrix} 1 & 1 & 0 \\ 1 & -1 & 0 \\ 0 & 0 & 1 \\ 0 & 0 & 1 \end{bmatrix} \begin{bmatrix} 1 & 1 & 0 \\ 1 & -1 & 0 \\ 0 & 0 & 1 \\ 0 & 0 & -1 \end{bmatrix} \begin{bmatrix} 1 & 1 & 0 \\ 1 & -1 & 0 \\ 0 & 0 & 1 \\ 0 & 0 & j \end{bmatrix} \begin{bmatrix} 1 & 1 & 0 \\ 1 & -1 & 0 \\ 0 & 0 & 1 \\ 0 & 0 & -j \end{bmatrix}$$

$$\begin{bmatrix} 1 & 0 & 0 \\ 1 & 0 & 0 \\ 0 & 1 & 1 \\ 0 & 1 & -1 \end{bmatrix} \begin{bmatrix} 1 & 1 & 0 \\ -1 & 0 & 0 \\ 0 & 1 & 1 \\ 0 & 1 & -1 \end{bmatrix} \begin{bmatrix} 1 & 0 & 0 \\ j & 0 & 0 \\ 0 & 1 & 1 \\ 0 & 1 & -1 \end{bmatrix} \begin{bmatrix} 1 & 0 & 0 \\ -j & 0 & 0 \\ 0 & 1 & 1 \\ 0 & 1 & -1 \end{bmatrix}$$

$$\begin{bmatrix} 1 & 1 & 0 \\ j & -j & 0 \\ 0 & 0 & 1 \\ 0 & 0 & 1 \end{bmatrix} \begin{bmatrix} 1 & 1 & 0 \\ j & -j & 0 \\ 0 & 0 & 1 \\ 0 & 0 & -1 \end{bmatrix} \begin{bmatrix} 1 & 1 & 0 \\ j & -j & 0 \\ 0 & 0 & 1 \\ 0 & 0 & j \end{bmatrix} \begin{bmatrix} 1 & 1 & 0 \\ j & -j & 0 \\ 0 & 0 & 1 \\ 0 & 0 & -j \end{bmatrix}$$

$$\begin{bmatrix} 1 & 0 & 0 \\ 1 & 0 & 0 \\ 0 & 1 & 1 \\ 0 & j & -j \end{bmatrix} \begin{bmatrix} 1 & 0 & 0 \\ -1 & 0 & 0 \\ 0 & 1 & 1 \\ 0 & j & -j \end{bmatrix} \begin{bmatrix} 1 & 0 & 0 \\ j & 0 & 0 \\ 0 & 1 & 1 \\ 0 & j & -j \end{bmatrix} \begin{bmatrix} 1 & 0 & 0 \\ -j & 0 & 0 \\ 0 & 1 & 1 \\ 0 & j & -j \end{bmatrix}$$

In this case, it can be determined, from the specific precoding matrix, the number of layers transmitted by the first panel and the number of layers transmitted by the second panel. The number of columns containing non-zero elements and corresponding to port 0 and port 1 is the number Q of layers from the first panel. That is, the first of the two SRS resources corresponding to the SRI or the first of the two RSs contained in the spatial information parameter(s) of the SRS resource corresponding to the SRI is associated with Q layers. The number of columns containing non-zero elements and corresponding to port 2 and port 3 is the number W of layers from the second panel. That is, the second of the two SRS resources corresponding to the SRI or the second of the two RSs contained in the spatial information parameter(s) of the SRS resource corresponding to the SRI is associated with W layers. Among the total of Q+W layers, the first Q layers are from the first panel and the last W layers are from the second panel.

However, 20 precoding matrices appear to be somewhat too large in number. To further restrict the number of precoding matrices in the codebook, the specification below is provided.

When coherent transmission is performed at both ports in each panel, that is, in a codebook, for the precoding matrix in which half of elements in each column are non-zero elements, an attribute of a phase coefficient in the upper left corner of the precoding matrix is the same as or opposite to an attribute of a phase coefficient in the lower right corner of the precoding matrix. Attributes of phase coefficients represented by elements are the same in the following manner: the elements are each a real number or are each an imaginary number; attributes of phase coefficients represented by elements are opposite to each other in the following manner: one element of the elements is a real number and another element of the elements is an imaginary number; the phase coefficient includes a phase compensated in a direction of polarization. This is similar to a downlink channel coefficient (see protocol 38.214). When P=2, row indexes (starting from 0 in the precoding matrix are the values of the last half of the precoded codes. When P=2 (each SRS resource is configured with two ports), the phase coefficients refer to the precoding coefficients of port 1 and port 3, that is, the values of the second row and the fourth row of the precoding matrix (row index 0 indicates the first row). The second row corresponds to the phase coefficient of one of the two panels. The fourth row corresponds to the phase coefficient of the other one of the two panels.

For example, in a codebook in which half of elements in each column of a precoding matrix are non-zero elements, it is specified that an attribute of a phase coefficient in the upper left corner of the precoding matrix is the same as an attribute of a phase coefficient in the lower right corner of the precoding matrix. That is, coefficients corresponding to port 1 and port 3 are both real or are both imaginary and cannot be one real coefficient and one imaginary coefficient. For example, the precoding matrix $$\begin{bmatrix} 1 & 1 & 0 \\ 1 & -1 & 0 \\ 0 & 0 & 1 \\ 0 & 0 & -j \end{bmatrix}$$

in Table 1-6.5 does not conform to this specification. In this manner, after precoding matrices that do not conform to this specification in Table 1-6.5 are removed, the remaining precoding matrices in the codebook are as listed in Table 1-6.6. The number of the remaining precoding matrices is only 12. The advantage of doing so is that the DCI overhead is reduced, and phase compensations of the two panels in different polarization directions are consistent with each other. If channel attributes of the two panels of the UE differ from each other only slightly, this method can be applied well without causing too much performance loss.

TABLE 1-6.6

$$\begin{bmatrix} 1 & 0 & 0 \\ 0 & 1 & 0 \\ 0 & 0 & 1 \\ 0 & 0 & 0 \end{bmatrix} \begin{bmatrix} 1 & 0 & 0 \\ 0 & 1 & 0 \\ 0 & 0 & 0 \\ 0 & 0 & 1 \end{bmatrix}$$

TABLE 1-6.6-continued $$\begin{bmatrix} 1 & 0 & 0 \\ 0 & 0 & 0 \\ 0 & 1 & 0 \\ 0 & 0 & 1 \end{bmatrix} \begin{bmatrix} 0 & 0 & 0 \\ 1 & 0 & 0 \\ 0 & 1 & 0 \\ 0 & 0 & 1 \end{bmatrix}$$

$$\begin{bmatrix} 1 & 1 & 0 \\ 1 & -1 & 0 \\ 0 & 0 & 1 \\ 0 & 0 & 1 \end{bmatrix} \begin{bmatrix} 1 & 1 & 0 \\ 1 & -1 & 0 \\ 0 & 0 & 1 \\ 0 & 0 & -1 \end{bmatrix}$$

$$\begin{bmatrix} 1 & 0 & 0 \\ 1 & 0 & 0 \\ 0 & 1 & 1 \\ 0 & 1 & -1 \end{bmatrix} \begin{bmatrix} 1 & 0 & 0 \\ -1 & 0 & 0 \\ 0 & 1 & 1 \\ 0 & 1 & -1 \end{bmatrix}$$

$$\begin{bmatrix} 1 & 1 & 0 \\ j & -j & 0 \\ 0 & 0 & 1 \\ 0 & 0 & j \end{bmatrix} \begin{bmatrix} 1 & 1 & 0 \\ j & -j & 0 \\ 0 & 0 & 1 \\ 0 & 0 & -j \end{bmatrix}$$

$$\begin{bmatrix} 1 & 0 & 0 \\ j & 0 & 0 \\ 0 & 1 & 1 \\ 0 & j & -j \end{bmatrix} \begin{bmatrix} 1 & 0 & 0 \\ -j & 0 & 0 \\ 0 & 1 & 1 \\ 0 & j & -j \end{bmatrix}$$

In a codebook in which half of elements in each column of a precoding matrix are non-zero elements, if it is specified that an attribute of a phase coefficient in the upper left corner of the precoding matrix is opposite to an attribute of a phase coefficient in the lower right corner of the precoding matrix, then among the coefficients corresponding to port 1 and port 3, one is a real coefficient and one is an imaginary coefficient. For example, the precoding matrix $$\begin{bmatrix} 1 & 1 & 0 \\ 1 & -1 & 0 \\ 0 & 0 & 1 \\ 0 & 0 & 1 \end{bmatrix}$$

in Table 1-6.5 does not conform to this specification. In this manner, after precoding matrices that do not conform to this specification in Table 1-6.5 are removed, the remaining precoding matrices in the codebook are as listed in Table 1-6.7. The number of the remaining precoding matrices is only 12. The advantage of doing so is that the DCI overhead is reduced, phase compensations of the two panels in different polarization directions are inconsistent with each other, and diversity gains are produced in some cases. If channel attributes of the two panels of the UE differ far from each other, this method can be applied well without causing too much performance loss.

TABLE 1-6.7

$$\begin{bmatrix} 1 & 0 & 0 \\ 0 & 1 & 0 \\ 0 & 0 & 1 \\ 0 & 0 & 0 \end{bmatrix} \begin{bmatrix} 1 & 0 & 0 \\ 0 & 1 & 0 \\ 0 & 0 & 0 \\ 0 & 0 & 1 \end{bmatrix}$$

TABLE 1-6.7-continued $$\begin{bmatrix} 1 & 0 & 0 \\ 0 & 0 & 0 \\ 0 & 1 & 0 \\ 0 & 0 & 1 \end{bmatrix} \begin{bmatrix} 0 & 0 & 0 \\ 1 & 0 & 0 \\ 0 & 1 & 0 \\ 0 & 0 & 1 \end{bmatrix}$$

$$\begin{bmatrix} 1 & 1 & 0 \\ 1 & -1 & 0 \\ 0 & 0 & 1 \\ 0 & 0 & j \end{bmatrix} \begin{bmatrix} 1 & 1 & 0 \\ 1 & -1 & 0 \\ 0 & 0 & 1 \\ 0 & 0 & -j \end{bmatrix}$$

$$\begin{bmatrix} 1 & 0 & 0 \\ j & 0 & 0 \\ 0 & 1 & 1 \\ 0 & 1 & -1 \end{bmatrix} \begin{bmatrix} 1 & 0 & 0 \\ -j & 0 & 0 \\ 0 & 1 & 1 \\ 0 & 1 & -1 \end{bmatrix}$$

$$\begin{bmatrix} 1 & 1 & 0 \\ j & -j & 0 \\ 0 & 0 & 1 \\ 0 & 0 & 1 \end{bmatrix} \begin{bmatrix} 1 & 1 & 0 \\ j & -j & 0 \\ 0 & 0 & 1 \\ 0 & 0 & -1 \end{bmatrix}$$

$$\begin{bmatrix} 1 & 0 & 0 \\ 1 & 0 & 0 \\ 0 & 1 & 1 \\ 0 & j & -j \end{bmatrix} \begin{bmatrix} 1 & 0 & 0 \\ -1 & 0 & 0 \\ 0 & 1 & 1 \\ 0 & j & -j \end{bmatrix}$$

7.2.3. For four-layer transmission, the two panels of the UE transmit two data layers separately: 2+2.

Similar to three-layer transmission, some rules may also be applied to four-layer transmission.

For example, when R=2, one precoding matrix in the codebook is a diagonal commutation of another precoding matrix in the codebook. See two matrices in Table 1-6.8 below.

TABLE 1-6.8

$$\begin{bmatrix} 1 & 0 & 0 \\ 0 & 1 & 0 \\ 0 & 0 & 1 \\ 0 & 0 & 0 \end{bmatrix} \begin{bmatrix} 1 & 0 & 0 \\ 0 & 1 & 0 \\ 0 & 0 & 0 \\ 0 & 0 & 1 \end{bmatrix}$$

$$\begin{bmatrix} 1 & 0 & 0 \\ 0 & 0 & 0 \\ 0 & 1 & 0 \\ 0 & 0 & 1 \end{bmatrix} \begin{bmatrix} 0 & 0 & 0 \\ 1 & 0 & 0 \\ 0 & 1 & 0 \\ 0 & 0 & 1 \end{bmatrix}$$

$$\begin{bmatrix} 1 & 1 & 0 \\ 1 & -1 & 0 \\ 0 & 0 & 1 \\ 0 & 0 & j \end{bmatrix} \begin{bmatrix} 1 & 1 & 0 \\ 1 & -1 & 0 \\ 0 & 0 & 1 \\ 0 & 0 & -j \end{bmatrix}$$

$$\begin{bmatrix} 1 & 0 & 0 \\ j & 0 & 0 \\ 0 & 1 & 1 \\ 0 & 1 & -1 \end{bmatrix} \begin{bmatrix} 1 & 0 & 0 \\ -j & 0 & 0 \\ 0 & 1 & 1 \\ 0 & 1 & -1 \end{bmatrix}$$

$$\begin{bmatrix} 1 & 1 & 0 \\ j & -j & 0 \\ 0 & 0 & 1 \\ 0 & 0 & 1 \end{bmatrix} \begin{bmatrix} 1 & 1 & 0 \\ j & -j & 0 \\ 0 & 0 & 1 \\ 0 & 0 & -1 \end{bmatrix}$$

TABLE 1-6.8-continued $$\begin{bmatrix} 1 & 0 & 0 \\ 1 & 0 & 0 \\ 0 & 1 & 1 \\ 0 & j & -j \end{bmatrix} \begin{bmatrix} 1 & 0 & 0 \\ -1 & 0 & 0 \\ 0 & 1 & 1 \\ 0 & j & -j \end{bmatrix}$$

As another example, in a codebook in which half of elements in each column of a precoding matrix are non-zero elements, an attribute of a phase coefficient in the upper left corner of the precoding matrix is the same as or opposite to an attribute of a phase coefficient in the lower right corner of the precoding matrix. For example, if it is specified that the preceding two attributes are opposite to each other, the precoding matrix $$\begin{bmatrix} 1 & 1 & 0 & 0 \\ j & -j & 0 & 0 \\ 0 & 0 & 1 & 1 \\ 0 & 0 & j & -j \end{bmatrix}$$

does not conform to the specification and should be removed from a codebook for four-layer transmission.

Embodiment Eight

Embodiments two to seven are described based on FIG. 3. In the case of two UE panels, if port mappings of four antennas are as shown in FIG. 4, the methods of some of the preceding precoding matrices change. In this case, in the first panel, transmission is performed at port 0 and port 2 mapped onto the first row and the third row of the precoding matrix; in the second panel, transmission is performed at port 1 and port 3 mapped onto the second row and the fourth row of the precoding matrix.

In this case, when the number of SRS resources corresponding to the SRI or the number of RSs contained in the spatial information parameter(s) of the corresponding SRS resource is greater than 1, for example, R=2, among elements in each column of the precoding matrix in the codebook, at least half of the elements are 0, and odd-numbered elements or even-numbered elements are all 0. See Table 1-7.1 below. Additionally, in the table, a, b, c, d, e and f may still be equal to 0.

TABLE 1-7.1

Port sequence number based on FIG. 4

$$\begin{bmatrix} \text{Port } 0 \\ \text{Port } 1 \\ \text{Port } 2 \\ \text{Port } 3 \end{bmatrix} \begin{bmatrix} a & c & 0 \\ 0 & 0 & e \\ b & d & 0 \\ 0 & 0 & f \end{bmatrix}$$

In this case, to increase the flexibility of the codebook, when R=2, one precoding matrix in the codebook is a diagonal commutation of another precoding matrix in the codebook. That is, elements in the upper left corner of a precoding matrix and elements in the lower right corner of the precoding matrix are transposed. The diagonal commutative matrix in this case can be understood as a matrix obtained in the following manner: X elements in the upper left corner of the precoding matrix are placed in the lower right corner of the precoding matrix, and Y elements in the lower right corner of the precoding matrix are placed in the upper left corner of the precoding matrix, where the obtained matrix is a diagonal commutative matrix of the precoding matrix. For example, see FIG. 7. X may not be equal to Y. Assuming that the precoding matrix contains Z rows, in the columns containing non-zero elements in the first row or the third row of the left precoding matrix, elements in the first row and the third row constitute X elements in the upper left corner; in the columns containing non-zero elements in the second row or the fourth row of the left precoding matrix, elements in the second row and the fourth row constitute Y elements in the lower right corner. Specifically. X/2 elements on the left of the first row of the precoding matrix are placed on the right of the second row of the precoding matrix. X/2 elements on the left of the third row of the precoding matrix are placed on the right of the fourth row of the precoding matrix. Y/2 elements on the right of the second row of the precoding matrix are placed on the left of the first row of the precoding matrix, and Y/2 elements on the right of the fourth row of the precoding matrix are placed on the left of the third row of the precoding matrix. See FIG. 7. It is to be understood that elements in the upper left corner of the precoding matrix are the precoding vector set of the first panel, and elements in the lower right corner of the precoding matrix are the precoding vector set of the second panel. After the diagonal commutation is completed, the precoding vectors of the two panels are transposed. When R=2, one precoding matrix contains two precoding vector sets (one vector is one column of the precoding matrix). The two precoding vector sets are in one-to-one correspondence with the two panels. In rows containing the non-zero elements of the precoding vectors in the first precoding vector set, the elements of the precoding vectors in the second precoding vector set are all 0.

In this case, when the number of SRS resources corresponding to the SRI is 2, spatial-relation information of P ports whose port numbers are even-numbered (or odd-numbered) in the precoding matrix is from the first of the two SRS resources indicated by the SRI, and spatial-relation information of P ports whose port numbers are odd-numbered (or even-numbered) in the precoding matrix is from the second of the two SRS resources indicated by the SRI. Alternatively, when the number of RSs contained in the spatial information parameter(s) of the SRS resource corresponding to the SRI is 2, spatial-relation information of P ports whose port numbers are even-numbered (or odd-numbered) in the precoding matrix is from the first of the RSs contained in the spatial information parameter(s) of the SRS resource indicated by the SRI, and spatial-relation information of P ports whose port numbers are odd-numbered (or even-numbered) in the precoding matrix is from the second of the RSs contained in the spatial information parameter(s) of the SRS resource indicated by the SRI.

In this case, it can be determined, from the specific precoding matrix, the number of layers transmitted by the first panel and the number of layers transmitted by the second panel. The number of columns containing non-zero elements and corresponding to port 0 and port 2 is the number Q of layers from the first panel. That is, the first of the two SRS resources corresponding to the SRI or the first of the two RSs contained in the spatial information parameter(s) of the SRS resource corresponding to the SRI is associated with Q layers. The number of columns containing non-zero elements and corresponding to port 1 and port 3 is the number W of layers from the second panel. That is, the second of the two SRS resources corresponding to the SRI or the second of the two RSs contained in the spatial information parameter(s) of the SRS resource corresponding to the SRI is associated with W layers. Among the total of Q+W layers, the first Q layers are from the first panel and the last W layers are from the second panel.

When coherent transmission is performed at both ports in each panel, that is, in a codebook in which half of elements in each column of a precoding matrix are non-zero elements, an attribute of a phase coefficient represented by an element in the upper left corner of the precoding matrix is the same as or opposite to an attribute of a phase coefficient represented by an element in the lower right corner of the precoding matrix. Attributes of phase coefficients represented by elements are the same in the following manner: the elements are each a real number or are each an imaginary number; attributes of phase coefficients represented by elements are opposite to each other in the following manner: one element of the elements is a real number and another element of the elements is an imaginary number; the phase coefficient includes a phase compensated in a direction of polarization. This is similar to a downlink channel coefficient (see protocol 38.214). When P=2, row indexes (starting from 0 in the precoding matrix are the values of the last half rows of the precoding matrix. When P=2 (each SRS resource is configured with two ports), the phase coefficients refer to the precoding coefficients of port 2 and port 3, that is, the values of the third row and the fourth row of the precoding matrix (row index 0 indicates the first row). The third row corresponds to the phase coefficient of one of the two panels. The fourth row corresponds to the phase coefficient of the other one of the two panels. If a codebook for uplink transmission is similar to a codebook for downlink transmission, the phase coefficient refers to $\varphi_n = e^{j\pi n/2}$.

Embodiment Nine

According to embodiments two to eight, when R>1, at least two layers are from different UE panels. In this case, the allocation of DMRS ports is different from that in the case of one UE panel, for example, single-panel two-layer transmission. DMRS port allocation is listed in Table 1-8.1 below.

TABLE 1-8.1

| Value | Number of DMRS CDM Groups Without Data | DMRS Port |
|---|---|---|
| 0 | 1 | 0, 1 |
| 1 | 2 | 0, 1 |
| 2 | 2 | 2, 3 |
| 3 | 2 | 0, 2 |
| ... | ... | ... |

To save DMRS overhead, it is a good choice to allocate port 0 and port 1 to a UE. However, when R>1, two transmission layers are from two different panels. The two different panels may have different time-frequency offsets, so port 0 and port 1 are no longer suitable. Since port 0 and port 1 are code-divided, in a code-division multiplexing (CDM) group, different time-frequency offsets may result in reduced demodulation performance.

Therefore, when an SRI corresponds to a different number of SRS resources or when spatial information parameters of SRS resources corresponding to the SRI contain a different number of RSs, DMRS port mappings are different in the case of transmission of the same number of layers.

Moreover, when R>1, multiple layers occupy at least two DMRS CDM groups. When R=1, there is no such restriction.

Optionally, different Rs correspond to different DMRS port mapping tables. That is, different Rs correspond to different port mapping candidate values. The DMRS port mapping table corresponding to the transmission of K layers when R>1 is different from the DMRS port mapping table corresponding to the transmission of K layers when R=1. Generally, when R>1, the DMRS port mapping table does not include the case where multiple layers only occupy a simple DMRS CDM group.

Embodiment Ten

Compared with FIG. 3, if a UE has two panels and each panel has four ports, the antenna patterns are as shown in FIGS. 8A and 8B. For a CSR, the DMRS scheme is also applicable to a codebook design such as a diagonal commutation. However, there are different details.

When multiple TPMIs (possibly a combination of multiple TPMIs) are indicated in DCI, the selection of the CSR depends on the number R of SRS resources corresponding to the SRI or the number of RSs contained in the spatial information parameter(s) of the SRS resource corresponding to the SRI. When R is greater than 1, the corresponding CSR is applied to a combination of multiple indicators about precoding information and the number of layers. In this case, the base station often indicates multiple TPMIs to the UE by using the DCI. To reduce the complexity, the number of non-zero elements in each column of one TPMI is the same as the number of non-zero elements in each column of another TPMI. Since the number of candidate four-antenna codebooks is too large, it may be further restricted that the precoding vectors corresponding to the multiple TPMIs have to be orthogonal with each other.

If the precoding transmission of the multiple panels is not performed in the manner indicated by multiple TPMIs, but in the codebook design manner, then the selection of a codebook for uplink transmission actually depends on the notification of the SRI in the DCI. Specifically, the selection of the codebook for uplink transmission actually depends on the number of SRS resources corresponding to the SRI or the number of RSs contained in the spatial information parameter(s) of the corresponding SRS resource.

Assuming that the number of ports configured for each resource in an SRS resource set for codebook-based uplink transmission is P, then when the number of SRS resources corresponding to the SRI or the number R of RSs contained in the spatial information parameters of the corresponding SRS resources is greater than 1, multi-panel transmission is performed. In this case, the number of rows of the precoding matrix in the corresponding codebook is P*R.

Therefore, the number of rows of the precoding matrix in the codebook depends on the number of SRS resources indicated by the SRI or the number of RSs contained in the spatial information parameter(s) of the corresponding SRS resource. When R=1, the number of rows of each precoding matrix in the codebook is P.

When the number of SRS resources corresponding to the SRI or the number of RSs contained in the spatial information parameter(s) of the corresponding SRS resource is greater than 1, among elements in each column of the precoding matrix in the codebook, at least half of the elements are 0 In this case, among elements in each column of the precoding matrix in the codebook, at least the first half of the elements are 0 or at least the second half of the elements are 0. See FIG. 8A. Alternatively, elements corresponding to ports in at least odd-numbered port groups are all 0 or elements corresponding to ports in at least even-numbered port groups are all 0. See FIG. 8B. It may be further restricted that all columns of the precoding matrix contain the same number of non-zero elements.

When the number of SRS resources corresponding to the SRI is 2, spatial-relation information of first P ports in the precoding matrix is from the first of the two SRS resources indicated by the SRI, and spatial-relation information of second P ports in the precoding matrix is from the second of the two SRS resources indicated by the SRI. Alternatively, when the number of RSs contained in the spatial information parameter(s) of the SRS resource corresponding to the SRI is 2, spatial-relation information of first P ports in the precoding matrix is from the first of the RSs contained in the spatial information parameter(s) of the SRS resource indicated by the SRI, and spatial-relation information of second P ports in the precoding matrix is from the second of the RSS contained in the spatial information parameter(s) of the SRS resource indicated by the SRI. See FIG. 8A. As shown in FIG. 8B, when the number of SRS resources corresponding to the SRI is 2, the precoding matrix contains a total of 2P rows, that is, a total of 2P ports. The 2P ports may be sequentially divided into four groups. Ports 0, . . . , (P/2−1) form the first group indexed as 0. Ports (P/2), . . . , (P−1) form the second group indexed as 1. Ports P. (3P/2−1) form the third group indexed as 2. Ports (3P/2), . . . , (2P) form the fourth group indexed as 3. Because P=4, port 0 and port 1 form the first group, port 2 and port 3 form the second group, port 4 and port 5 form the third group, and port 6 and port 7 form the fourth group. In this case, spatial-relation information of P ports whose port numbers are in even-numbered groups (or odd-numbered groups) in the precoding matrix is from the first of the two SRS resources indicated by the SRI, and spatial-relation information of P ports whose port numbers are in odd-numbered groups (or even-numbered groups) in the precoding matrix is from the second of the two SRS resources indicated by the SRI. Alternatively, when the number of RSs contained in the spatial information parameter(s) of the SRS resource corresponding to the SRI is 2, spatial-relation information of P ports whose port numbers are in even-numbered groups (or odd-numbered groups) in the precoding matrix is from the first of the RSs contained in the spatial information parameter(s) of the SRS resource indicated by the SRI, and spatial-relation information of P ports whose port numbers are in odd-numbered groups (or even-numbered groups) in the precoding matrix is from the second of the RSs contained in the spatial information parameter(s) of the SRS resource indicated by the SRI. Even-numbered groups refer to groups indexed as 0 and 2. Odd-numbered groups refer to groups indexed as 1 and 3.

When R=2, each of the two panels of the UE transmits a data stream separately based on a different beam, and the number of transmission layers is at least two. In this case, the number of DMRS ports is at least 2.

When R=2, one precoding matrix in the codebook is a diagonal commutation of another precoding matrix in the codebook. The diagonal commutation means that elements in the upper left corner of a precoding matrix and elements in the lower right corner of the precoding matrix are transposed. In this case, one precoding matrix contains two precoding vector sets (one vector is one column of the precoding matrix). The two precoding vector sets are in one-to-one correspondence with the two panels. In rows containing the non-zero elements of the precoding vectors in the first precoding vector set, the elements of the precoding vectors in the second precoding vector set are all 0. For FIG. 8A, similar to the description in embodiment seven, the diagonal commutative matrix refers to a matrix obtained in the following manner: X elements in the upper left corner of the precoding matrix are placed in the lower right corner of the precoding matrix, and Y elements in the lower right corner of the precoding matrix are placed in the upper left corner of the precoding matrix, where the obtained matrix is a diagonal commutative matrix of the precoding matrix. X may not be equal to Y. Assuming that the precoding matrix contains Z rows, the number of all elements in the first Z/2 rows contained in the columns having non-zero elements in the first Z/2 rows of precoding matrix is X. and the number of all elements of the second Z/2 rows contained in the columns having non-zero elements in the second Z/2 rows of precoding matrix is Y.

For FIG. 8B, after the 2P ports are sequentially divided into four groups, if the number of columns containing non-zero elements that belong to even-numbered port groups in the precoding matrix is T1, X elements in the T1 columns, in the upper left corner and in the even-numbered port groups in the precoding matrix are transferred to positions of elements in the T1 columns, in the lower right corner and in odd-numbered port groups in the precoding matrix. If the number of columns containing non-zero elements that belong to odd-numbered port groups in the precoding matrix is T2, elements in the T2 columns, in the lower right corner and in the odd-numbered port groups in the precoding matrix are transferred to positions of elements in the T2 columns, in the upper left corner and in even-numbered port groups in the precoding matrix. The port groups are indexed starting from 0. Port groups 0 and 2 are even-numbered groups. Port groups 1 and 3 are odd-numbered groups.

As shown in FIG. 9, in the left precoding matrix, in the rows (rows 0, 1, 4 and 5) containing ports belonging to even-numbered port groups, the column containing non-zero elements is the first column. That is. T1=1. Thus, in the first column, elements in rows 0, 1, 4 and 5 constitute X elements in the upper left corner. Then, the X elements are transferred to positions of elements in one column, in the lower right corner and in odd-numbered port groups. That is, elements in rows 0, 1, 4 and 5 in the first column are transferred to positions of elements in rows 2, 3, 6 and 7 in the last column respectively. Conversely, in the left precoding matrix, the number of columns containing non-zero elements that belong to odd-numbered port groups is T2, That is, columns containing non-zero elements at ports 2, 3, 6 and 7 are the two columns on the right. T2=2. Thus, elements in rows 2, 3, 6 and 7 in the second two columns constitute Y elements in the lower right corner. The Y elements are transferred to positions of elements in rows 0, 1, 4 and 5 in the first two columns respectively. The transformed matrix is the right matrix as shown in FIG. 9.

It is to be noted that at least one precoding matrix in the codebook described in this embodiment is a diagonal commutation of another precoding matrix in the codebook.

Since there are too many candidate sets for the codebook when R>1, the codebook for coherent transmission in the panel can be further defined as below.

When R>1, for example, R=2, and the number of non-zero elements in each column of the precoding matrix in the codebook is P, vectors composed of non-zero elements in columns of the precoding matrix in the codebook are orthogonal to each other. As shown in FIG. 9, vectors [a0 a1 a2 a3], [b0 b1 b2 b3] and [c0 c1 c2 c3] are all orthogonal vectors.

Embodiment Eleven

This embodiment provides an indication apparatus. FIG. 10 shows an indication apparatus 10 provided in this embodiment. The apparatus includes a notification module 101.

The notification module 101 is configured to notify a DMRS port indicator, an SRI and a transmission precoding matrix indicator to a terminal to notify basic information. The basic information includes at least one of DMRS port indication information, precoding codebook or precoding matrix information, or a CSR. The basic information is determined based on a value of the SRI.

Specifically, in this embodiment, the corresponding basic information may be determined based on the size of value R corresponding to the SRI. The value R denotes the number of SRS resources or the number of RSs contained in the spatial information parameter(s) of the corresponding SRS resource.

It is to be noted that the indication apparatus provided in this embodiment can be applied to a base station. For ease of description, hereinafter operations of the base station can be performed by the indication apparatus.

In this embodiment, multiple separate indicators about precoding information and the number of layers may be notified to the UE in the DCI completely separately. However, such an operation incurs too much physical-layer signaling overhead and causes the UE complexity to be greatly increased. To reduce the DCI overhead, it is feasible to restrict a combination of multiple indicators about precoding information and the number of layers corresponding to multiple UE panels. That is, in this embodiment, the base station may configure a codebook subset restriction for the UE. The codebook subset restriction is applied to a combination of multiple indicators about precoding information and the number of layers. In this manner, when the value R corresponding to the SRI is greater than 1 (that is, when two or more SRS resources are indicated), a CSR applied to a combination of multiple indicators about precoding information and the number of layers is selected to restrict a combination of multiple indicators about precoding information and the number of layers corresponding to the multiple UE panels.

Here it is to be noted that a CSR is also configured for the SRI when the value R corresponding to the SRI is 1. The CSR is used for restricting selection of an indicator about precoding information and the number of layers when the SRI corresponds to one SRS resource, not involving a combination of multiple indicators about precoding information and the number of layers.

Moreover, to reduce the UE complexity and the CSR overhead, in this embodiment, it is feasible to specify that when R>1, the base station notifies multiple precoding matrices in the DCI and all columns of the notified precoding matrices have the same number of non-zero elements. Thus, the indicated precoding attributes of the multiple panels of the UE have to be the same. That is, among the multiple TPMIs indicated to the UE, the number of non-zero elements in one column of one TPMI is the same as the number of non-zero elements in one column of another TPMI. It is to be understood that in a precoding matrix, the number of non-zero elements represents the transmission capability of the UE. For example, $$TPMI = \frac{1}{\sqrt{2}}\begin{bmatrix}1\\0\end{bmatrix}$$

represents non-coherent transmission while $$TPMI = \frac{1}{\sqrt{2}}\begin{bmatrix}1\\1\end{bmatrix}$$

represents full coherent transmission. It is thus specified that in the multiple panels of the UE, either coherent transmissions or non-coherent transmission is performed. With such a specification, the precoding attributes of different panels have to be the same, and the CSR may not be required for restriction (of course, the CSR may be used for restriction at the same time).

In this embodiment, the base station may configure multiple sets of CSRs for the UE. The application of the CSRs actually depends on the indication of the SRI. For example, the base station may configure two sets of codebook subset restrictions for the UE through higher-layer signaling. One is used for single-panel transmission and the other one is used for multi-panel transmission. The application of a codebook subset restriction, however, actually depends on the number of SRS resources indicated by an SRI. Specifically, when the SRI indicated in the DCI corresponds to one SRS resource, the first set of CSRs is used, and when the SRI indicated in the DCI corresponds to two or more SRS resources, the second set of CSRs is used.

Optionally, the base station may configure one set of CSRs for each value of the SRI. In this manner, the flexibility is the highest, and the base station can even make different codebook subset restrictions on different panels of the UE.

In this embodiment, to further reduce the UE complexity, it is feasible to redesign a codebook for multi-panel transmission, and the new codebook is different from the codebook for the original single-panel transmission. Thus, when R corresponding to the SRI is greater than 1, the corresponding codebook for multi-panel transmission is selected. In this embodiment, different codebooks may be designed for different values R. That is, in this embodiment, when R is greater than 1, a codebook corresponding to the value R is selected, and then a transmit precoding matrix is determined based on the transmission precoding matrix indicator and the codebook corresponding to the value R.

In this embodiment, when R>1, the number of rows of the precoding matrix in the selected codebook is P*R. P*R indicates that there are P*R ports. The P*R ports sequentially correspond to the rows of the precoding matrix. P denotes the number of ports configured for each SRS resource corresponding to the SRI. For example, in a precoding matrix containing 4 (2*2) rows, the first row to the fourth row sequentially correspond to port 0 to 3. In the two antenna panel structures shown in FIG. 3, the four ports of the two antenna panels are 0 to 3 in sequence. In this case, the first two rows of the precoding matrix correspond to the first SRS resource and are from the first panel, and the second two rows of the precoding matrix correspond to the second SRS resource and are from the second panel. In the two antenna panel structures shown in FIG. 4, the four ports of the two antenna panels are 0, 2, 1 and 3 in sequence. In this case, the first row and the third row of the precoding matrix correspond to the first SRS resource and are from the first panel, and the second row and the fourth row of the precoding matrix correspond to the second SRS resource and are from the second panel.

Moreover, in an example of this embodiment, in each column of the precoding matrix in the codebook, elements 0 occupy a proportion of at least $$\left(1-\frac{1}{R}\right).$$

That is, when one panel transmits one layer of data, other panels do not transmit data at this layer.

Moreover, if the first half of the ports in the precoding matrix belong to the first panel and the second half of the ports in the precoding matrix belong to the second panel, then when the number of SRS resources corresponding to the SRI or the number of RSs contained in the spatial information parameter(s) of the corresponding SRS resource is greater than 1, among elements in each column of the precoding matrix in the codebook, at least the first half of the elements are 0 or at least the second half of the elements are 0.

In an example of this embodiment, to restrict the number of candidate precoding matrices, it is feasible to specify that all columns of the precoding matrices in the codebook have the same number of non-zero elements.

Moreover, in an example of this embodiment, in the precoding matrix in the codebook, the P*R ports may be sequentially divided into four groups. Elements corresponding to ports in at least odd-numbered port groups are all 0 or elements corresponding to ports in at least even-numbered port groups are all 0.

In an example of this embodiment, when R=2, spatial-relation information of first P ports corresponding to the precoding matrix is from the first of the SRS resources indicated by the SRI or from the first of the RSs contained in the spatial information parameter(s) of the SRS resource indicated by the SRI. Spatial-relation information of second P ports corresponding to the precoding matrix is from the second of the SRS resources indicated by the SRI or from the second of the RSs contained in the spatial information parameter(s) of the SRS resource indicated by the SRI.

In an example of this embodiment, when R=2, the 2P ports may be sequentially divided into four groups. Spatial-relation information of P ports whose port numbers are in even-numbered groups of the four groups corresponding to the precoding matrix is from the first of the SRS resources indicated by the SRI or from the first of the RSs contained in the spatial information parameter(s) of the SRS resource indicated by the SRI. Spatial-relation information of P ports whose port numbers are in odd-numbered groups of the four groups corresponding to the precoding matrix is from the second of the SRS resources indicated by the SRI or from the second of the RSs contained in the spatial information parameter(s) of the SRS resource indicated by the SRI.

In an example of this embodiment, when R=2, at least one precoding matrix among the precoding matrices in the codebook is a diagonal commutative matrix of another precoding matrix among the precoding matrices in the codebook.

It is to be noted that the diagonal commutative matrix refers to a matrix obtained in the following manner: rows of the precoding matrix containing P*R rows are divided into four groups, and in the case where the number of columns containing non-zero elements that belong to even-numbered groups in the precoding matrix containing P*R rows is T1, X elements in the T1 columns, in the upper left corner and in the even-numbered groups in the precoding matrix containing P*R rows are transferred to positions of elements in the T1 columns, in the lower right corner and in odd-numbered groups in the precoding matrix containing P*R rows; in the case where the number of columns containing non-zero elements that belong to odd-numbered groups in the precoding matrix containing P*R rows is T2, Y elements in the T2 columns, in the lower right corner and in the odd-numbered groups in the precoding matrix containing P*R rows are transferred to positions of elements in the T2 columns, in the upper left corner and in even-numbered groups in the precoding matrix containing P*R rows, where the obtained matrix is a diagonal commutative matrix of the precoding matrix containing P*R rows; or the diagonal commutative matrix refers to a matrix obtained in the following manner: X elements in the upper left corner of the precoding matrix are placed in the lower right corner of the precoding matrix, and Y elements in the lower right corner of the precoding matrix are placed in the upper left corner of the precoding matrix, where the obtained matrix is a diagonal commutative matrix of the precoding matrix. X and Y are positive integers. For example. FIG. 5 shows two diagonal commutative matrices.

In an example of this embodiment, when R>1 and the number of non-zero elements in each column of the precoding matrix in the codebook is P, vectors composed of non-zero elements in columns of the precoding matrix in the codebook are orthogonal to each other.

It is to be noted that in an example of this embodiment, when R=2 and half of elements in each column of the precoding matrix are non-zero elements, an attribute of a phase coefficient represented by an element in the upper left corner of the precoding matrix is the same as or opposite to an attribute of a phase coefficient represented by an element in the lower right corner of the precoding matrix. It is to be noted that attributes of phase coefficients represented by elements are the same in the following manner: the elements are each a real number or are each an imaginary number; attributes of phase coefficients represented by elements are opposite to each other in the following manner: one element of the elements is a real number and another element of the elements is an imaginary number; the phase coefficient includes a phase compensated in a direction of polarization.

It is to be understood that in practical application, when R>1, at least two transmission layers are from different UE panels. In this case, the allocation of DMRS ports is different from that in the case of one UE panel. To save DMRS overhead, it is a good choice to allocate port 0 and port 1 to a UE. However, when R>1, two transmission layers are from two different panels. The two different panels may have different time-frequency offsets, so port (and port 1 are no longer suitable. Since port 0 and port 1 are code-divided, in a code-division multiplexing (CDM) group, different time-frequency offsets may result in reduced demodulation performance. Therefore, in an example of this embodiment, when R>1, the number of DMRS ports indicated by the DMRS port indication information is at least 2, or the case where the number of transmission layers is 1 is not included in a precoding codebook.

Moreover, when R>1, multiple layers occupy at least two DMRS CDM groups. When R=1, there is no such restriction.

Moreover, in this embodiment, different Rs may be configured to correspond to different DMRS port mappings. That is, different Rs correspond to different DMRS port mapping tables. That is, different Rs correspond to different port mapping candidate values. The DMRS port mapping table corresponding to K transmission layers when R>1 is different from the DMRS port mapping table corresponding to K transmission layers when R=1. Generally, when R>1, the DMRS port mapping table does not include the case where multiple layers only occupy a simple DMRS CDM group.

Correspondingly. FIG. 11 shows an information determination apparatus 11 provided for the UE and corresponding to the indication apparatus shown in FIG. 10. The information determination apparatus 11 is applied to the UE. The information determination apparatus 11 includes a reception and determination module 111. For ease of description, hereinafter operations of the terminal can be performed by the information determination apparatus.

The reception and determination module 111 is configured to receive the DMRS port indicator, the SRI and the transmission precoding matrix indicator notified by the base station to determine the basic information. The basic information includes at least one of the DMRS port indication information, the precoding codebook or precoding matrix information, or the CSR.

It is to be noted that in this embodiment, the basic information such as the DMRS port indication information, the precoding codebook or precoding matrix information, or the CSR is determined by the UE based on a value of the SRI.

Specifically, in this embodiment, the corresponding basic information may be determined by the UE based on the size of value R corresponding to the SRI. The value R denotes the number of SRS resources or the number of RSs contained in the spatial information parameter(s) of the corresponding SRS resource.

In an example of this embodiment, when R>1, the CSR selected by the UE is a CSR applied to a combination of multiple indicators about precoding information and the number of layers.

In an example of this embodiment, when R>1, the UE may receive multiple precoding matrices notified in DCI (the same column of the notified precoding matrices has the same number of non-zero elements).

In an example of this embodiment, when R>1, the UE may select a codebook corresponding to the value R and then determines a transmit precoding matrix based on the transmission precoding matrix indicator and the codebook corresponding to the value R.

In an example of this embodiment, when R>1, the number of rows of the precoding matrix in the codebook selected by the UE is P*R. P*R indicates that there are P*R ports. The P*R ports sequentially correspond to the rows of the precoding matrix. P denotes the number of ports configured for each SRS resource corresponding to the SRI.

In the preceding example in which the number of rows of the precoding matrix in the codebook selected by the UE is P*R, in each column of the precoding matrix in the codebook, elements 0 occupy a proportion of at least $$\left(1 - \frac{1}{R}\right);$$

Moreover, in the preceding example, all columns of the precoding matrix in the codebook may contain the same number of non-zero elements.

In the preceding example in which the number of rows of the precoding matrix in the codebook selected by the UE is P*R, among elements in each column of the precoding matrix in the codebook, at least the first half of the elements are 0 or at least the second half of the elements are 0 Alternatively, in the precoding matrix in the codebook, the P*R ports may be sequentially divided into four groups. Elements corresponding to ports in at least odd-numbered port groups are all 0 or elements corresponding to ports in at least even-numbered port groups are all 0.

In the preceding example in which the number of rows of the precoding matrix in the codebook selected by the UE is P*R, when R=2, spatial-relation information of first P ports corresponding to the precoding matrix is from the first of the SRS resources indicated by the SRI or from the first of the RSs contained in the spatial information parameter(s) of the SRS resource indicated by the SRI. Spatial-relation information of second P ports corresponding to the precoding matrix is from the second of the SRS resources indicated by the SRI or from the second of the RSs contained in the spatial information parameter(s) of the SRS resource indicated by the SRI.

In the preceding example in which the number of rows of the precoding matrix in the codebook selected by the UE is P*R, when R=2, the 2P ports may be sequentially divided into four groups. Spatial-relation information of P ports whose port numbers are in even-numbered groups of the four groups corresponding to the precoding matrix is from the first of the SRS resources indicated by the SRI or from the first of the RSs contained in the spatial information parameter(s) of the SRS resource indicated by the SRI. Spatial-relation information of P ports whose port numbers are in odd-numbered groups of the four groups corresponding to the precoding matrix is from the second of the SRS resources indicated by the SRI or from the second of the RSs contained in the spatial information parameter(s) of the SRS resource indicated by the SRI.

In the preceding example in which the number of rows of the precoding matrix in the codebook selected by the UE is P*R, when R=2, at least one precoding matrix among the precoding matrices in the codebook is a diagonal commutative matrix of another precoding matrix among the precoding matrices in the codebook.

It is to be noted that the diagonal commutative matrix refers to a matrix obtained in the following manner: rows of the precoding matrix containing P*R rows are divided into four groups, and in the case where the number of columns containing non-zero elements that belong to even-numbered groups in the precoding matrix containing P*R rows is T1, X elements in the T1 columns, in the upper left corner and in the even-numbered groups in the precoding matrix containing P*R rows are transferred to positions of elements in the T1 columns, in the lower right corner and in odd-numbered groups in the precoding matrix containing P*R rows; in the case where the number of columns containing non-zero elements that belong to odd-numbered groups in the precoding matrix containing P*R rows is T2, Y elements in the T2 columns, in the lower right corner and in the odd-numbered groups in the precoding matrix containing P*R rows are transferred to positions of elements in the T2 columns, in the upper left corner and in even-numbered groups in the precoding matrix containing P*R rows, where the obtained matrix is a diagonal commutative matrix of the precoding matrix containing P*R rows; or the diagonal commutative matrix refers to a matrix obtained in the following manner: X elements in the upper left corner of the precoding matrix are placed in the lower right corner of the precoding matrix, and Y elements in the lower right corner of the precoding matrix are placed in the upper left corner of the precoding matrix, where the obtained matrix is a diagonal commutative matrix of the precoding matrix. X and Y are positive integers.

In an example of this embodiment, when R>1 and the number of non-zero elements in each column of the precoding matrix in the codebook is P, vectors composed of non-zero elements in columns of the precoding matrix in the codebook are orthogonal to each other.

It is to be noted that in an example of this embodiment, when R=2 and half of elements in each column of the precoding matrix are non-zero elements, an attribute of a phase coefficient represented by an element in the upper left corner of the precoding matrix is the same as or opposite to an attribute of a phase coefficient represented by an element in the lower right corner of the precoding matrix. It is to be noted that attributes of phase coefficients represented by elements are the same in the following manner: the elements are each a real number or are each an imaginary number; attributes of phase coefficients represented by elements are opposite to each other in the following manner: one element of the elements is a real number and another element of the elements is an imaginary number; the phase coefficient includes a phase compensated in a direction of polarization.

It is to be understood that in practical application, when R>1, at least two transmission layers are from different UE panels. In this case, the allocation of DMRS ports is different from that in the case of one UE panel. To save DMRS overhead, it is a good choice to allocate port 0 and port 1 to a UE. However, when R>1, two transmission layers are from two different panels. The two different panels may have different time-frequency offsets, so port 0 and port 1 are no longer suitable. Since port 0 and port 1 are code-divided, in a CDM group, different time-frequency offsets may result in reduced demodulation performance. Therefore, in an example of this embodiment, when R>1, the number of DMRS ports indicated by the DMRS port indication information received by the UE is at least 2, or the case where the number of transmission layers is 1 is not included in a precoding codebook.

Moreover, when R>1, multiple layers occupy at least two DMRS CDM groups. When R=1, there is no such restriction. Moreover, in this embodiment, different Rs may be configured to correspond to different DMRS port mappings. That is, different Rs correspond to different DMRS port mapping tables.

In fact, the standards on the terminal (that is, the information determination apparatus) are fully in conformity with the standards on the base station (that is, the indication apparatus). The terminal can correspondingly determine information such as the DMRS port indication information, the precoding codebook or precoding matrix information, or the CSR simply according to each indicator transmitted by the base station. Then the terminal can transmit the PUSCH according to the beam or panel of the indicated SRS resource.

In the indication method and information determination method provided in this embodiment of the present disclosure, the DMRS port indicator, the SRI and the transmission precoding matrix indicator are notified to the terminal so that terminal can determine the basic information (the basic information includes at least one of the DMRS port indication information, the precoding codebook or precoding matrix information, or the CSR, and the basic information is determined based on the value of the SRI) required for codebook-based uplink transmission. In this manner, the terminal can implement data transmission in a single-panel or multiple-panel case according to the requirements of the base station. That is, the base station can notify the DMRS mapping information, the CSR, the precoding codebook and the like implicitly according to the dynamic indication of the SRI, thereby enabling the terminal to dynamically switch between a single beam and multiple beams effectively. In this manner, multi-panel transmission can be supported, and dynamic indication between single-panel transmission and multi-panel transmission can be flexibly supported.

Embodiment Twelve

Figure 12:
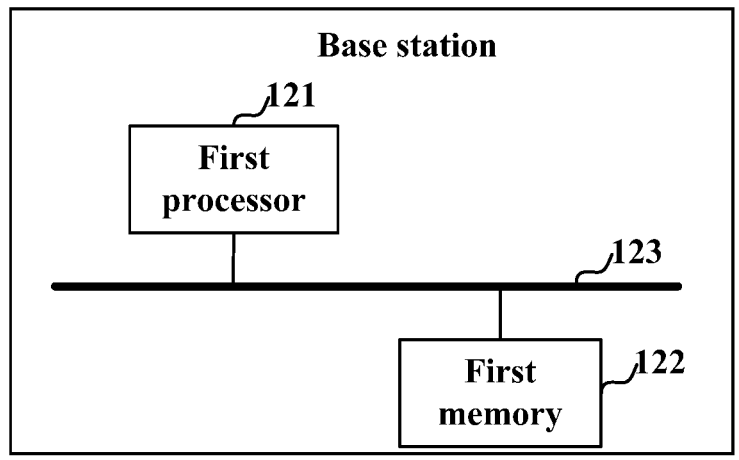
FIG. 12 is a structure diagram of a base station according to embodiment twelve of the present disclosure.

This embodiment provides a base station. As shown in FIG. 12, the base station includes a first processor 121, a first memory 122 and a first communication bus 123. The first communication bus 123 is configured to enable connection and communication between the first processor 121 and the first memory 122. The first processor 121 is configured to execute one or more first programs stored in the first memory 122 to perform the indication method described in embodiment one to embodiment ten.

Figure 13:
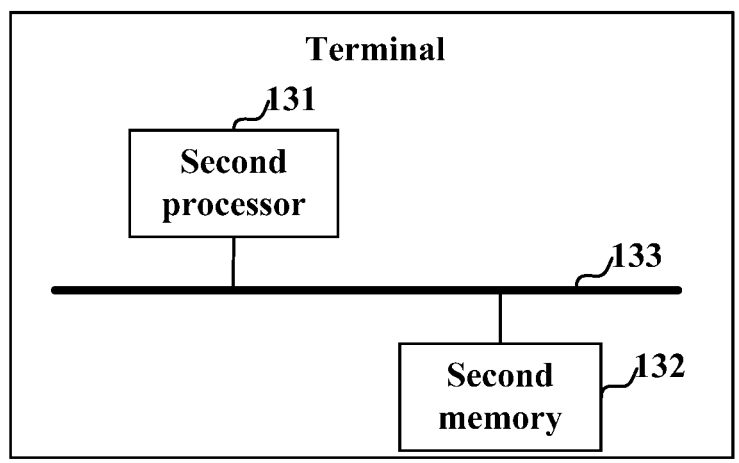
FIG. 13 is a structure diagram of a terminal according to embodiment twelve of the present disclosure.

This embodiment further provides a terminal. As shown in FIG. 13, the terminal includes a second processor 131, a second memory 132 and a second communication bus 133. The second communication bus 133 is configured to enable connection and communication between the second processor 131 and the second memory 132. The second processor 131 is configured to execute one or more second programs stored in the second memory 132 to perform the information determination method described in embodiment one to embodiment ten.

This embodiment further provides a storage medium. The storage medium includes a volatile or nonvolatile medium or a removable or non-removable medium implemented in any method or technology for storing information (such as computer-readable instructions, data structures, computer program modules or other data). The storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer.

The storage medium provided in this embodiment stores computer-executable instructions. The computer-executable instructions are executable by one or more processors for implementation of the indication method or the information determination method described in embodiment one to embodiment ten. The details are not repeated here.

If not in collision, the technical features in embodiments of the present disclosure may be combined with each other and used in one embodiment. Each embodiment is merely an implementation of the present disclosure.

Moreover, it is to be understood by those skilled in the art that some or all steps of the preceding method and function modules/units in the preceding system or apparatus may be implemented as software (which may be implemented by computer program codes executable by a computing device), firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Moreover, as is known to those having ordinary skill in the art, communication media generally include computer-readable instructions, data structures, computer program modules, or other data in carriers or in modulated data signals transported in other transport mechanisms and may include any information delivery medium. Therefore, the present application is not limited to any particular combination of hardware and software.

The above is a more detailed description of embodiments of the present disclosure in conjunction with implementations and is not to be construed as limiting embodiments of the present application. For those having ordinary skill in the art to which the present application pertains, simple deductions or substitutions may be made without departing from the concept of the present application and are considered to fall within the scope of the present application.

What is claimed is:

1. An indication method, comprising:
notifying a demodulation reference signal (DMRS) port indicator, at least one sounding reference signal resource indicator (SRI) and a transmission precoding matrix indicator to a terminal to notify basic information, wherein the basic information comprises at least one of:
DMRS port indication information, precoding codebook or precoding matrix information, or a codebook subset restriction (CSR),
wherein the basic information is determined based on a value of the at least one SRI in the following manner:
at least one of the precoding codebook or precoding matrix information, or the codebook subset restriction (CSR) is determined based on R corresponding to the at least one SRI, wherein R denotes a number of sounding reference signal (SRS) resources corresponding to the at least one SRI or a number of reference signals (RSs) contained in a spatial information parameter of an SRS resource corresponding to the at least one SRI;
wherein in a case where the basic information comprises the CSR, the basic information is determined based on the value of the at least one SRI in the following manner:
in a case where R>1, a selected CSR is applied to a plurality of indicators about precoding information and a number of layers.

2. The method of claim 1, wherein in a case where the basic information comprises the precoding matrix information, the basic information is determined based on the value of the at least one SRI in the following manner:
in a case where R>1, a plurality of precoding matrices are notified in downlink control information (DCI), wherein all columns of the plurality of precoding matrices have a same number of non-zero elements.

3. The method of claim 1, wherein the basic information comprises the precoding codebook or precoding matrix information, and in a case where R>1, the method further comprises:

indicating a codebook corresponding to R; and indicating at least one precoding matrix based on the transmission precoding matrix indicator and the codebook corresponding to R.

4. The method of claim 3, wherein in the case where R>1, a number of rows of each of the at least one precoding matrix in the codebook corresponding to R is P*R, wherein P*R indicates that the SRS resources corresponding to the at least one SRI have P*R ports, and the P*R ports sequentially correspond to the rows of each of the at least one precoding matrix in the codebook corresponding to R; and P denotes a number of ports configured for each of the SRS resources corresponding to the at least one SRI.

5. The method of claim 4, wherein in each column of each of the at least one precoding matrix in the codebook corresponding to R, elements 0 occupy a proportion of at least $$\left(1 - \frac{1}{R}\right);$$

or among elements in each column of each of the at least one precoding matrix in the codebook corresponding to R, at least a first half of the elements are 0 or at least a second half of the elements are 0; or in each of the at least one precoding matrix in the codebook corresponding to R, elements corresponding to ports in at least odd-numbered port groups are all 0 or elements corresponding to ports in at least even-numbered port groups are all 0, wherein the P*R ports are sequentially and equally divided into four groups.

6. The method of claim 4, wherein in a case where R=2, spatial-relation information of first P ports corresponding to each of the at least one precoding matrix in the codebook corresponding to R is from a first of the SRS resources indicated by the at least one SRI or from a first of the RSs contained in the spatial information parameter of the SRS resource indicated by the at least one SRI; spatial-relation information of second P ports corresponding to each of the at least one precoding matrix in the codebook corresponding to R is from a second of the SRS resources indicated by the at least one SRI or from a second of the RSs contained in the spatial information parameter of the SRS resource indicated by the at least one SRI; or in a case where R=2, 2P ports corresponding to each of the at least one precoding matrix in the codebook corresponding to R are sequentially divided into four groups, and spatial-relation information of P ports whose port numbers are in even-numbered groups of the four groups corresponding to each of the at least one precoding matrix in the codebook corresponding to R is from a first of the SRS resources indicated by the at least one SRI or from a first of the RSs contained in the spatial information parameter of the SRS resource indicated by the at least one SRI; spatial-relation information of P ports whose port numbers are in odd-numbered groups of the four groups corresponding to each of the at least one precoding matrix in the codebook corresponding to R is from a second of the SRS resources indicated by the at least one SRI or from a second of the RSs contained in the spatial information parameter of the SRS resource indicated by the at least one SRI.

7. The method of claim 1, wherein in a case where R>1, a plurality of transmission layers occupy at least two DMRS code-division multiplexing (CDM) groups; or wherein different values R correspond to different DMRS port mappings.

8. An information determination method, comprising:

receiving a demodulation reference signal (DMRS) port indicator, at least one sounding reference signal resource indicator (SRI) and a transmission precoding matrix indicator notified by a base station to determine basic information, wherein the basic information comprises at least one of:

DMRS port indication information, precoding codebook or precoding matrix information, or a codebook subset restriction (CSR), wherein the basic information is determined based on a value of the at least one SRI in the following manner:

at least one of the precoding codebook or precoding matrix information, or the codebook subset restriction (CSR) is determined based on R corresponding to the at least one SRI, wherein R denotes a number of sounding reference signal (SRS) resources corresponding to the at least one SRI or a number of reference signals (RSs) contained in a spatial information parameter of an SRS resource corresponding to the at least one SRI;

wherein in a case where the basic information comprises the CSR, the basic information is determined based on the value of the at least one SRI in the following manner:

in a case where R>1, a selected CSR is applied to a plurality of indicators about precoding information and a number of layers.

9. The method of claim 8, wherein in a case where the basic information comprises the precoding matrix information, the basic information is determined based on the value of the at least one SRI in the following manner:

in a case where R>1, a plurality of precoding matrices notified in downlink control information (DCI) are received, wherein a same column of the plurality of precoding matrices has a same number of non-zero elements.

10. The method of claim 8, wherein the basic information comprises the precoding codebook or precoding matrix information, and in a case where R>1, the method further comprises:

selecting a codebook corresponding to R; and determining at least one precoding matrix based on the transmission precoding matrix indicator and the codebook corresponding to R.

11. The method of claim 10, wherein in the case where R>1, a number of rows of each of the at least one precoding matrix in the codebook corresponding to R is P*R, wherein P*R indicates that the SRS resources corresponding to the at least one SRI are configured with P*R ports, and the P*R ports sequentially correspond to the rows of each of the at least one precoding matrix in the codebook corresponding to R; and P denotes a number of ports configured for each of the SRS resources corresponding to the at least one SRI.

12. The method of claim 11, wherein
in each column of each of the at least one precoding matrix in the codebook corresponding to R, elements 0 occupy a proportion of at least $$\left(1-\frac{1}{R}\right);$$

or
among elements in each column of each of the at least one precoding matrix in the codebook corresponding to R, at least a first half of the elements are 0 or at least a second half of the elements are 0; or
in each of the at least one precoding matrix in the codebook corresponding to R, elements corresponding to ports in at least odd-numbered port groups are all 0 or elements corresponding to ports in at least even-numbered port groups are all 0, wherein the P*R ports are sequentially and equally divided into four groups.

13. The method of claim 11, wherein
in a case where R=2, spatial-relation information of first P ports corresponding to each of the at least one precoding matrix in the codebook corresponding to R is from a first of the SRS resources indicated by the at least one SRI or from a first of the RSs contained in the spatial information parameter of the SRS resource indicated by the at least one SRI; spatial-relation information of second P ports corresponding to each of the at least one precoding matrix in the codebook corresponding to R is from a second of the SRS resources indicated by the at least one SRI or from a second of the RSs contained in the spatial information parameter of the SRS resource indicated by the at least one SRI; or
in a case where R=2, 2P ports corresponding to each of the at least one precoding matrix in the codebook corresponding to R are sequentially divided into four groups, and spatial-relation information of P ports whose port numbers are in even-numbered groups of the four groups corresponding to each of the at least one precoding matrix in the codebook corresponding to R is from a first of the SRS resources indicated by the at least one SRI or from a first of the RSs contained in the spatial information parameter of the SRS resource indicated by the at least one SRI; spatial-relation information of P ports whose port numbers are in odd-numbered groups of the four groups corresponding to each of the at least one precoding matrix in the codebook corresponding to R is from a second of the SRS resources indicated by the at least one SRI or from a second of the RSs contained in the spatial information parameter of the SRS resource indicated by the at least one SRI.

14. The method of claim 8, wherein in a case where R>1, the transmission layers occupy at least two DMRS code-division multiplexing (CDM) groups; or wherein different values R correspond to different DMRS port mappings.

15. A base station, comprising a first processor, a first memory and a first communication bus, wherein
the first communication bus is configured to enable connection and communication between the first processor and the first memory; and
the first processor is configured to execute at least one first program stored in the first memory to perform the indication method of claim 1.

16. A terminal, comprising a second processor, a second memory and a second communication bus, wherein
the second communication bus is configured to enable connection and communication between the second processor and the second memory; and
the second processor is configured to execute at least one second program stored in the second memory to perform the following steps:
receiving a demodulation reference signal (DMRS) port indicator, at least one sounding reference signal resource indicator (SRI) and a transmission precoding matrix indicator notified by a base station to determine basic information, wherein the basic information comprises at least one of:
DMRS port indication information, precoding codebook or precoding matrix information, or a codebook subset restriction (CSR),
wherein the basic information is determined based on a value of the at least one SRI in the following manner:
at least one of the precoding codebook or precoding matrix information, or the codebook subset restriction (CSR) is determined based on R corresponding to the at least one SRI, wherein R denotes a number of sounding reference signal (SRS) resources corresponding to the at least one SRI or a number of reference signals (RSs) contained in a spatial information parameter of an SRS resource corresponding to the at least one SRI;
wherein in a case where the basic information comprises the CSR, the basic information is determined based on the value of the at least one SRI in the following manner:
in a case where R>1, a selected CSR is applied to a plurality of indicators about precoding information and a number of layers.

* * * * *